(12) United States Patent
Goh et al.

(10) Patent No.: US 10,575,664 B2
(45) Date of Patent: Mar. 3, 2020

(54) ARTICLE FOR MOUNTING TO A VERTICAL SURFACE

(71) Applicant: ORIBEL PTE. LTD., Singapore (SG)

(72) Inventors: Su Min Goh, Singapore (SG); Liang Yi Chen, Singapore (SG)

(73) Assignee: ORIBEL PTE. LTD., Singapore (SG)

( * ) Notice: Subject to any disclaimer, the term of this patent is extended or adjusted under 35 U.S.C. 154(b) by 0 days.

(21) Appl. No.: 15/743,254

(22) PCT Filed: Jul. 15, 2016

(86) PCT No.: PCT/SG2016/050339
§ 371 (c)(1),
(2) Date: Jan. 9, 2018

(87) PCT Pub. No.: WO2017/010951
PCT Pub. Date: Jan. 19, 2017

(65) Prior Publication Data
US 2018/0192793 A1   Jul. 12, 2018

Related U.S. Application Data

(60) Provisional application No. 62/193,524, filed on Jul. 16, 2015.

(51) Int. Cl.
*A47G 1/00* (2006.01)
*A47G 1/17* (2006.01)
(Continued)

(52) U.S. Cl.
CPC .............. *A47G 1/17* (2013.01); *A63H 5/00* (2013.01); *A63H 18/02* (2013.01); *B42F 9/001* (2013.01);
(Continued)

(58) Field of Classification Search
CPC ...... A47G 1/17; A47G 1/1606; A47G 1/1613; A47G 1/164; A47G 1/175
(Continued)

(56) References Cited

U.S. PATENT DOCUMENTS

| 5,980,401 A | 11/1999 | Erlewine |
| 6,406,781 B1 * | 6/2002 | Hamerski .............. A47G 1/175 |
| | | 428/317.3 |
| 6,832,445 B2 | 12/2004 | Pitzen |
| 6,835,452 B1 | 12/2004 | Hamerski |

(Continued)

FOREIGN PATENT DOCUMENTS

CN          201630933 U        11/2010

OTHER PUBLICATIONS

Written Opinions and International Search Report of PCT/SG2016/050339.
(Continued)

*Primary Examiner* — Steven M Marsh
(74) *Attorney, Agent, or Firm* — JCIP; Joseph G. Chu; Jeremy I. Maynard

(57) ABSTRACT

An article for mounting to a vertical surface comprising a substrate having a first layer formed from a flexible film or sheet and a second layer formed with a conventional low-tack non-reactive reusable adhesive effective for attaching the substrate to drywall or plaster or wood surfaces. At least one rigid component is attached to the substrate. The second layer covers at least a portion of the first layer for attaching to a vertical surface and includes a release area, wherein the release area is positioned such that it is vertically above the at least one rigid component. The rigid component operates to produce a cantilever moment and wherein the release area operates to counteract the cantilever moment.

38 Claims, 24 Drawing Sheets

(51) Int. Cl.
*A63H 5/00* (2006.01)
*A63H 18/02* (2006.01)
*C09J 7/20* (2018.01)
*B42F 9/00* (2006.01)
*F16M 13/02* (2006.01)
*A47G 25/06* (2006.01)
*A63F 9/06* (2006.01)

(52) U.S. Cl.
CPC ............... *C09J 7/20* (2018.01); *F16M 13/02* (2013.01); *A47G 25/0607* (2013.01); *A63F 2009/0668* (2013.01); *B42P 2241/10* (2013.01); *C09J 2201/606* (2013.01)

(58) Field of Classification Search
USPC ................... 248/466, 467, 475.1, 477, 478
See application file for complete search history.

(56) References Cited

U.S. PATENT DOCUMENTS

| | | | |
|---|---|---|---|
| 6,972,141 B1* | 12/2005 | Bries | C09J 7/20 |
| | | | 428/40.1 |
| 9,920,783 B2* | 3/2018 | Runge | F16B 11/006 |
| 10,259,194 B2* | 4/2019 | Cowman-Eggert | B32B 7/06 |
| 2012/0032043 A1 | 2/2012 | McGreevy et al. | |
| 2014/0054434 A1* | 2/2014 | Chen | A47G 1/0633 |
| | | | 248/467 |
| 2014/0256217 A1 | 9/2014 | Telfer | |

OTHER PUBLICATIONS

International Preliminary Report on Patentability of PCT/SG2016/050339.

* cited by examiner

ARTICLE FOR MOUNTING TO A VERTICAL SURFACE

TECHNICAL FIELD

The subject invention relates to an article for mounting to a vertical surface and particularly to an article for mounting to a vertical surface, such as a wall, a door or windows, for use by individuals, such as children, for entertainment.

BACKGROUND

The following discussion of the background to the invention is intended to facilitate an understanding of the present invention only. It should be appreciated that the discussion is not an acknowledgement or admission that any of the material referred to was published, known or part of the common general knowledge of the person skilled in the art in any jurisdiction as at the priority date of the invention.

Various articles have been developed for mounting to vertical surfaces, such as walls. Often such articles are attached to the vertical surfaces by permanent attaching systems, such as hooks, brackets, and the like. Unfortunately, such articles cannot be easily moved or when removed from the vertical surface they leave undesirable marks.

Other articles have been developed that are attached to vertical surfaces using an adhesive or a tape utilizing releasable adhesives. Unfortunately, such tapes and adhesives are made for general uses, such as to hold a stationary object that has little or no interaction with users other than to place or remove an object from a component. It is also often difficult to remove the article from the vertical surface. In addition, such releasable adhesives and tapes often do not have the strength to secure a particular article to the vertical surface while allowing the article to be easily removed, transported and reattached to a vertical surface at another location.

One problem associated with releasable adhesives is that when they are used to secure relatively rigid or semi-rigid components to a vertical surface, they often cause damage to the surface when removed. When a releasable adhesive is used to secure a flexible component, such as component formed from paper or a relatively thin film or sheet, the component is capable of flexing allowing the user to peel the releasable adhesive at an angle thereby avoiding or minimizing damage to the vertical surface. Unfortunately, when the releasable adhesive is used to attach a rigid or semi-rigid component (or a rigid component attached to a film or flexible sheet which is then attached to the vertical surface by a releasable adhesive), the substrate near the component is unable to flex or bend sufficiently to allow the user to peel the releasable adhesive at an angle which will minimize damage to the vertical surface. It has also been found that this inability to flex or bend results in the adhesive under the component to be released in its entirety and suddenly which often results in damage to the vertical surface.

Accordingly, it would be desirable to have an article, such as an article used for entertainment and has substantial interaction with a user, that can be removably attached to a vertical surface, that has sufficient strength to maintain the article on the vertical surface during use, that can be easily removed from the vertical surface without damaging the surface, transported to another location and remounted to a vertical surface at that location.

SUMMARY OF THE INVENTION

Throughout the specification, unless the context requires otherwise, the word "comprise" or variations such as "comprises" or "comprising", will be understood to imply the inclusion of a stated integer or group of integers but not the exclusion of any other integer or group of integers.

Furthermore, throughout the specification, unless the context requires otherwise, the word "include" or variations such as "includes" or "including", will be understood to imply the inclusion of a stated integer or group of integers but not the exclusion of any other integer or group of integers.

The subject invention is directed to an article for mounting to a vertical surface comprising a substrate preferably formed from a flexible film or sheet and having a conventional low-tack non-reactive reusable adhesive effective for attaching the substrate to drywall or plaster or wood surfaces. At least one rigid or semi-rigid component is attached to the substrate. In a preferred embodiment the substrate includes a first layer attached to the component and a second adhesive layer that covers at least a portion of the first layer for attaching to a vertical surface and wherein the second adhesive layer is positioned such that it is vertically above the at least one rigid or semi-rigid component. When mounted to the vertical surface, the at least one component operates to produce a cantilever moment and wherein the second adhesive layer operates to provide sufficient area (also known as "a release area") such that the adhesive strength is able to counteract or resist the cantilever moment created by the at least one component and any additional force caused by the interaction of the component and a user.

In another preferred embodiment of the invention, said release area has a vertical distance above said at least one component, and wherein said at least one component produces a cantilever moment and wherein said vertical distance of said release area is sufficient to counter said cantilever moment.

In another preferred embodiment of the invention, said vertical distance of said release area is at least 2.5 centimeters (cm). In another preferred embodiment of the invention, said vertical distance of said release area is between 2.5 cm and 6.5 cm.

In another preferred embodiment of the invention the article further comprises a release tab that operates to provide a grip for use in peeling the substrate from the vertical surface.

In another preferred embodiment of the invention, said release tab is in close proximity to said at least one component.

In another preferred embodiment of the invention, said substrate comprises a single or a plurality of layers.

In another preferred embodiment of the invention the substrate has a thickness of about 0.25 mm to about 0.45 mm.

In another preferred embodiment of the invention the substrate is formed from a laminated film.

In a preferred embodiment of the invention the substrate comprises a plurality of layers laminated together.

In another preferred embodiment of the invention the substrate includes at least one printed surface.

In another preferred embodiment of the invention the rigid or semi-rigid component is attached to the substrate with a high bond strength chemical adhesive formed from a first epoxy component and a hardener and the substrate includes a low-tack non-reactive reusable adhesive to attach the substrate to the vertical surface.

In another preferred embodiment of the invention the rigid or semi-rigid component is attached to the substrate with a two sided high tack tape which may comprise of a foam structure sandwiched between the sides.

In another preferred embodiment of the invention the two sided tape has a front face and a back face, wherein the front face having an adhesive effective for securely bonding to the first layer formed from a plastic sheet or film and a back face having a conventional low-tack non-reactive reusable adhesive effective for attaching the substrate to drywall or plaster or wood surfaces.

In another preferred embodiment of the invention the at least one rigid or semi-rigid component in the form of an entertainment device selected from the list consisting of a design having a knob, clip, a shape sorter, a balancer, a puzzle, a sound maker, a story board and/or jigsaw puzzle, a musical instrument, a mechanical gear system, and a play track.

A preferred embodiment of the invention is an article for mounting to a vertical surface comprising a substrate having at least one rigid or semi-rigid component attached to the substrate and a low-tack non-reactive reusable adhesive covering at least a portion of the substrate and operates to releasably attaching the substrate to a vertical surface and having a release area, wherein the release area is positioned such that it is above the highest point of the one or more rigid or semi-rigid component(s) and has a height (vertical distance "H") of at least 2.5 cm such that it is able to counter any cantilever moment of the one or more rigid or semi-rigid component(s) and the force acted on the latter by a user. This arrangement of the present invention ensures that the substrate 102 adheres to the vertical surface. In some embodiments of the invention, the vertical distance H is between 2.5 cm and 6.5 cm.

In another preferred embodiment of the invention the substrate has a first layer and a second layer attached to the first layer and wherein the at least one rigid or semi-rigid component is attached to the first layer and wherein the adhesive covering is attached to the second layer.

In another preferred embodiment of the invention the article further comprises a release tab that is line with a non-sticky backing sheet that operates to ease the removal of the substrate and to provide a grip for use in peeling the substrate from the vertical surface.

In another preferred embodiment of the invention, said at least one or more component(s) is permanently attached to a contact area, said contact area comprises a front surface arranged to face said at least one component, and a back surface arranged to face said vertical surface, wherein said back surface is not covered by said adhesive covering.

In another preferred embodiment of the invention, said back surface is masked by a backing sheet.

In another preferred embodiment of the invention, said backing sheet is made of non-adhesive plastic film or paper sheet.

In another preferred embodiment of the invention, said back surface has a plurality of perforations.

In another preferred embodiment of the invention the substrate comprises a printed film laminated on one side of the substrate.

In another preferred embodiment of the invention the at least one rigid or semi-rigid component is attached to the substrate using one or more mechanical fasteners.

In another preferred embodiment of the invention the article comprises a substrate formed from a plurality of layers, at least one rigid or semi-rigid component attached to the substrate and an adhesive for releasably attaching the substrate to a vertical surface.

In another preferred embodiment of the invention the substrate comprises a backing material for receiving mechanical fasteners for attaching one or more rigid or semi-rigid components to the substrate.

In another preferred embodiment of the invention the substrate includes a foam or an elastomeric backing material that operates to absorb a portion of the downward force and moment created during use of the article.

In another preferred embodiment of the invention the substrate includes a back side and is shaped, perforated or partially covered with a backing sheet to minimize the contact or reduce the bond strength of the adhesive with the vertical surface.

In a preferred embodiment of the invention the article is a toy for use by a child.

In another preferred embodiment of the invention the article is a sound maker.

In another preferred embodiment of the invention the article is a puzzle having a plurality of pieces.

In a preferred embodiment of the invention the article is a puzzle having a plurality of pieces each comprising a low-tack, non-reactive reusable adhesive layer for releasably mounting the plurality of pieces.

In a preferred embodiment of the invention the article is a toy comprising a mechanical movement or gear system.

In a preferred embodiment of the invention the article comprises a knob or clip.

In a preferred embodiment of the invention the article comprises a shape sorter.

In a preferred embodiment of the invention the article comprises a balancer.

In a preferred embodiment of the invention the article comprises a musical instrument.

In a preferred embodiment of the invention the article comprises a play track.

Another preferred embodiment of the invention comprises a substrate having a back side and a front side, the back side having a non-reactive reusable adhesive and the front side having a surface that operates to permit one or more components to be permanently attached to the substrate using an adhesive.

In a preferred embodiment of the invention the substrate comprises a first layer and a printed film laminated on one side of the first layer.

In a preferred embodiment of the invention the components comprise one or more detachable elements.

In a preferred embodiment of the invention the one or more components comprise a plurality of detachable elements that operate together to form a puzzle or story characters.

In a preferred embodiment of the invention the components comprise one or more detachable elements having a plurality of layers.

In a preferred embodiment of the invention the one or more components have micro-features and one or more detachable elements comprise a low tack adhesive film that adhere to the micro-features.

In a preferred embodiment of the invention the one or more components comprise one or more play features.

In a preferred embodiment of the invention the article comprises a play feature in the form of a track having one or more movable elements.

In a preferred embodiment of the invention the article comprises a play feature in the form of a gear system and movable elements that operate together.

Various other objects, advantages, and embodiments of the invention will be apparent from the following description, the accompanying drawings, and the appended claims.

BRIEF DESCRIPTION OF THE DRAWINGS

The present invention will be described, by way of example only, with reference to the accompanying drawings, in which.

EMBODIMENTS OF THE INVENTION

Figure 1:
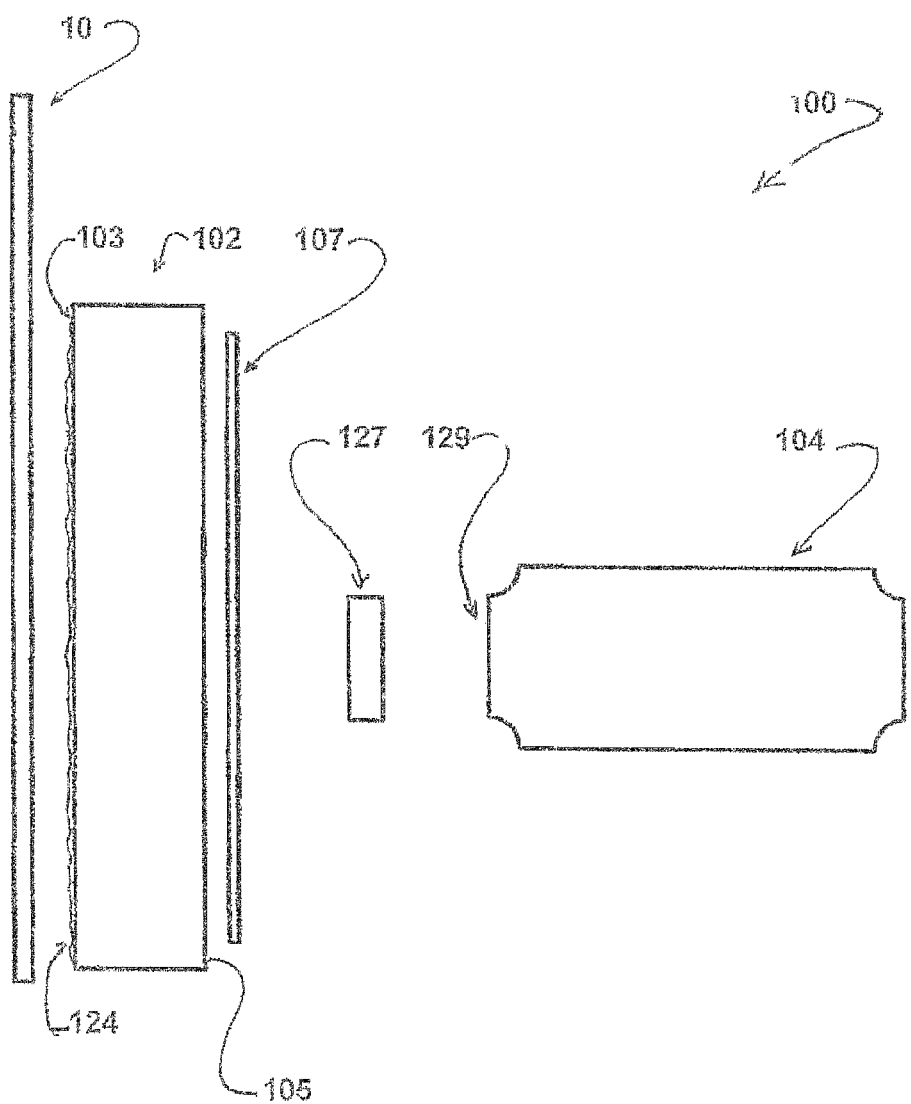
FIG. 1 is an exploded side schematic illustration of a preferred embodiment of an article for mounting to a vertical surface showing a substrate having a back side with an adhesive thereon for attaching to a vertical surface and a printable front side having a component permanently attached thereto.

The present invention relates to an article for mounting to a vertical surface for use by individuals, such as children, for entertainment. In describing the embodiments of the invention illustrated in the drawings, specific terminology will be resorted to for the sake of clarity. However, the invention is not intended to be limited to the specific terms so selected, and it is to be understood that each specific term includes all technical equivalents that operate in a similar manner to accomplish a similar purpose. As used herein the term vertical refers to a direction perpendicular to the ground and the term "horizontal" refers to the direction parallel to the ground. The term "above" refers to a position that is a distance vertically farther away from the ground and the term "below" refers to a position that is a distance vertically closer to the ground. As used the term "front" refers to the direction away from the vertical surface and the term "back" refers to the direction towards the vertical surface.

Throughout the description, unless the context requires otherwise, the term "pressure-sensitive adhesive" (PSA, self-adhesive, self-stick adhesive) refers to adhesives that adhere to a substrate when applied with pressure. For some pressure-sensitive adhesives, no solvent, water, or heat is needed to activate the adhesives. The pressure-sensitive adhesive can be used in pressure-sensitive tapes, labels, glue dots, note pads, automobile trim, and a wide variety of other products.

Throughout the description, unless the context requires otherwise, the term "low-tack" refers to an adhesive whose adhesive strength (or tackiness), although sufficient to maintain temporary attachment between a component and a substrate, is low enough to be manually detached without affecting the integrity of the component and the substrate.

Throughout the description, unless the context requires otherwise, the term "high-tack" refers to an adhesive having a sufficiently high adhesive strength (i.e., high bond strength) to keep a component and a substrate permanently affixed together.

Referring to FIG. 1, a preferred embodiment of the article 100 for mounting to a vertical surface 10 is shown. The article 100 comprises a substrate 102 effective for providing a structure for attaching the article to the vertical surface 10. In the preferred embodiment the substrate 102 is in the form of a single PVC material layer having a thickness of about 0.18 millimeters (mm) with a pressure sensitive adhesive 124 applied to the back side 103 of the substrate 102 and having a printable front side 105. In another preferred embodiment, the front side 105 of the substrate 102 includes a relatively thin polymer film 107 laminated thereto, such as by a cold process whereby the thin polymer film 107 (which is sticky) is rolled out and adhered to the substrate or by a hot process whereby heat is applied to the substrate and film to melt and fuse the film and substrate together. The film 107 has a glossy or a matt finish depending on the desired aesthetic appearance of the substrate. In a preferred embodiment of the invention one or more rigid or semi-rigid components 104 protrude generally perpendicularly outwardly from the substrate and are permanently attached to the front side 105 of the substrate 102 or the film 107, such as by means of a high tack double sided permanent tape 127 which is cut, such as by die cutting, or by a permanent adhesive in a shape corresponding to the attachment end 129 of the attached component 104 and having the adhesion strength to permanently secure the component to the substrate.

Figure 2:
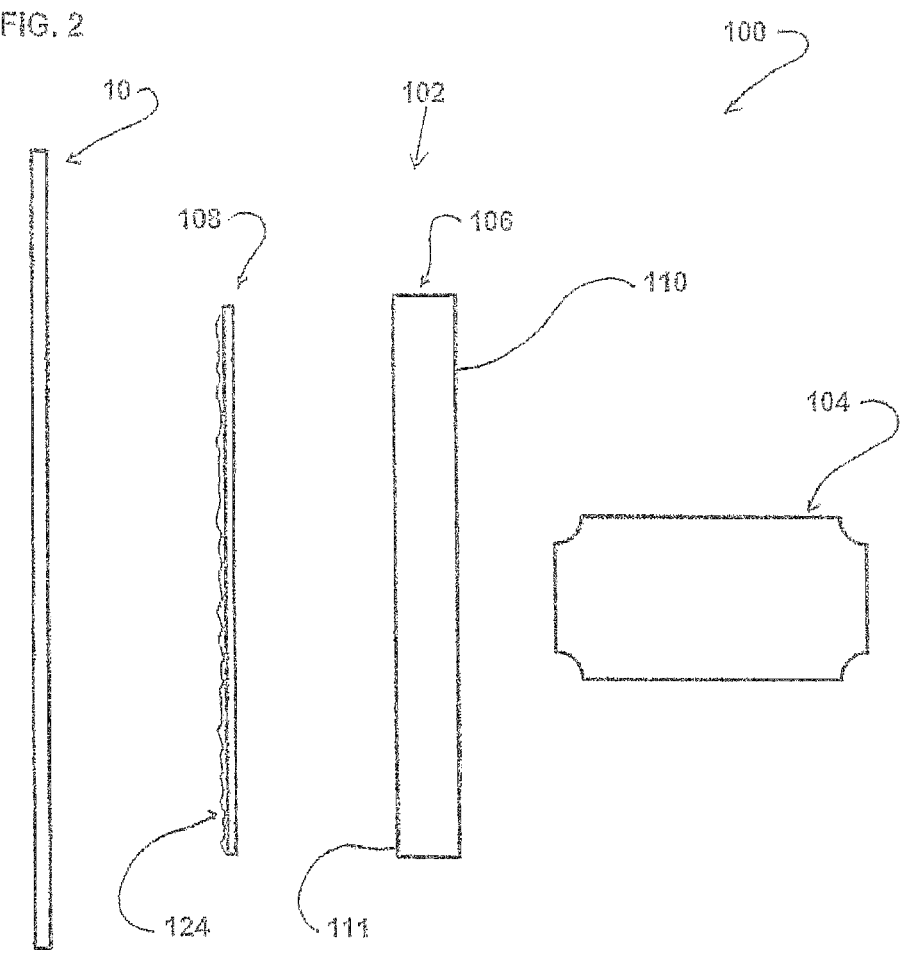
FIG. 2 is an exploded side schematic illustration of another preferred embodiment of an article for mounting to a vertical surface showing a substrate comprising a first layer for mounting one or more components and a second layer having an adhesive thereon for releasably bonding to a vertical surface.

Referring to FIG. 2, a preferred embodiment of the article for mounting to a vertical surface 10 is shown comprising a substrate 102 effective for providing a structure for attaching the article 100 to a vertical surface 10, such as a wall. In some embodiments of the invention, the wall can be made of cement, concrete, wood, bricks, plaster, plastic or glass. In some embodiments of the invention, the wall is painted with liquid wall paint. In some embodiments of the invention, the wall surface is covered with wall paper. In a preferred embodiment of the invention, the substrate 102 is formed such that it is capable of supporting one or more components 104 thereon. The substrate can be formed as a single layer substrate or can be formed as a multiple layered substrate. The one or more components 104 can be a rigid or a semi-rigid component and the one or more components 104 can comprise rigid or semi-rigid components or any combination of rigid and semi-rigid components.

In a preferred embodiment of the invention the substrate 102 comprises a first layer 106 in the form of a flexible plastic film or sheet and a second layer 108 having a conventional low-tack (releasable) non-reactive reusable adhesive 124 for contacting the vertical surface 10 and effective for attaching the substrate to drywall or plaster or wood surfaces. In a preferred embodiment, the first layer 106 has a front surface 110 and a back surface 111 with printed material along the front and/or back surfaces.

Figure 3:
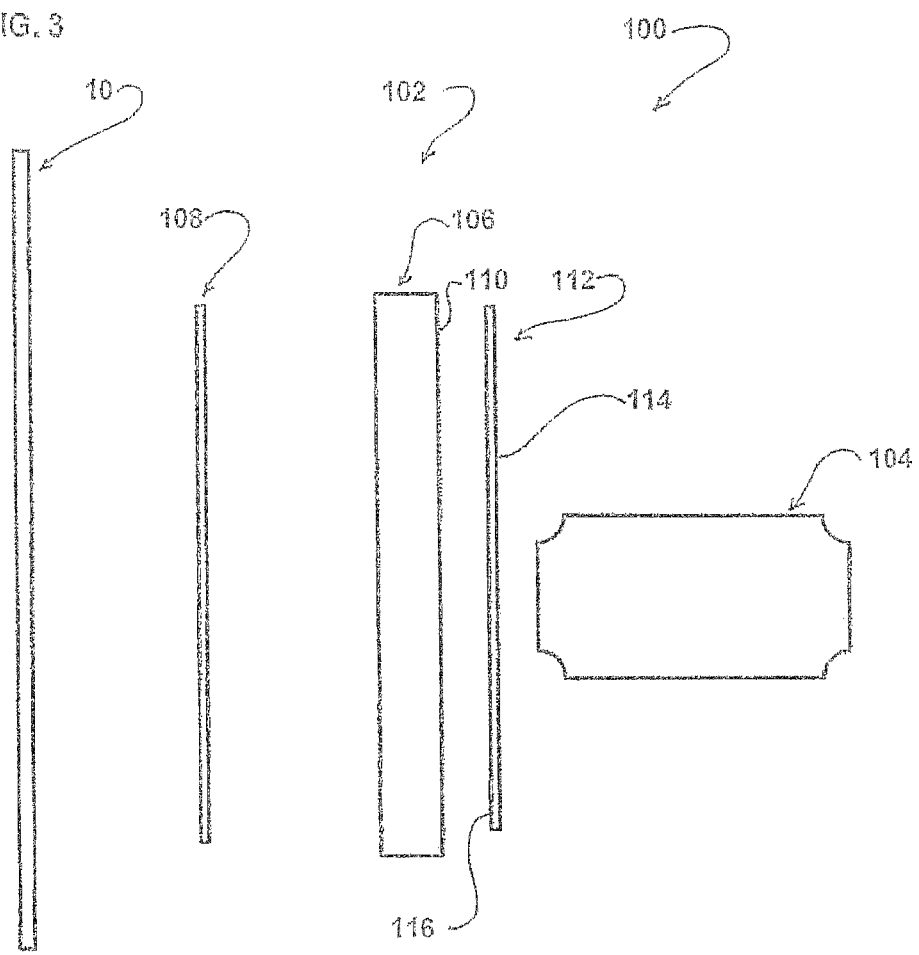
FIG. 3 is an exploded side schematic illustration of another preferred embodiment of an article for mounting to a vertical surface showing a substrate comprising a first layer with a film laminated thereon.

In another preferred embodiment, laminated to the front surface 110 of the first layer 106 is a film 112 (FIG. 3). The film 112 preferably is transparent and includes a front face 114 and a back face 116 and is effective for preventing or reducing the likelihood that printing on the front surface 110 of the first layer 106 is scratched or rubbed off during use. In another preferred embodiment, the back face 116 of the film 112 has reverse printing thereon which prevents or reduces the likelihood that the printing is scratched or rubbed off during use.

In a preferred embodiment, as shown in FIG. 2, the first layer 106 is formed from a polyethylene terephthalate (PET) material having a thickness of about 0.15 mm to about 0.325 mm. In another preferred embodiment, as shown in FIG. 3, the first layer 106 is formed from a polyethylene (PE) or polypropylene (PP) material having a thickness of about 0.15 mm and a film layer 112 formed from polyethylene terephthalate (PET) material having a thickness of about 0.21 mm. It should be understood, however, that the substrate of the article, including any layers comprising the substrate, may be of any convenient size and thickness suitable for its particular purpose. As a general principle, the substrate should preferably be large enough to permit one or more components to be securely attached to the substrate as well being a large enough for the adhesive along the surface of the substrate or the second layer to effectively bond the article to the vertical surface and to maintain the article on the vertical surface without slippage or disengaging during use. In another preferred embodiment of the invention the substrate has a thickness of about 0.135 mm to about 0.435 mm as it has been found that for about a 8 kilograms (kg) component, the thickness of the substrate is preferably about 0.25 mm or greater to maintain structural integrity in use and/or resist tearing. It should be understood, however, that the thickness of the substrate may vary depending on the particular composition of the substrate (the thickness of the substrate, or the number and thickness of various layers comprising the substrate), the particular size and weight of the one or more components, and the intended use of the article.

Figure 4:
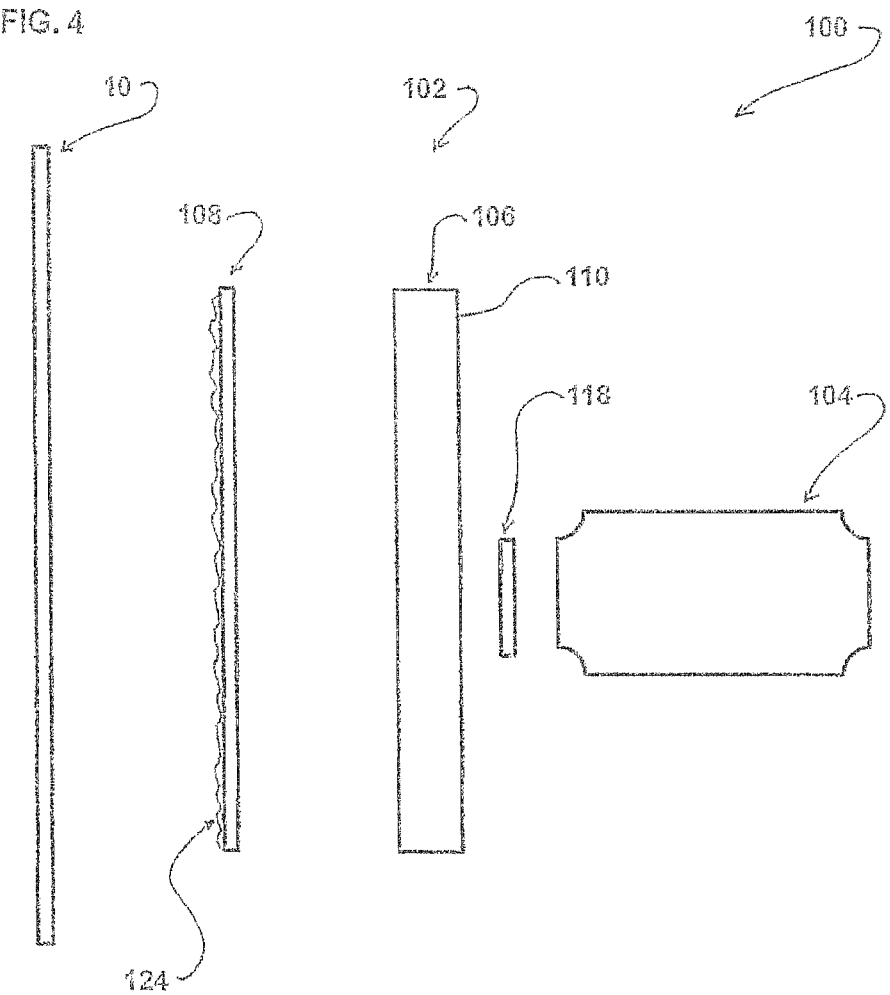
FIG. 4 is an exploded side schematic illustration of another preferred embodiment of an article for mounting to a vertical surface showing a substrate comprising a first layer with an adhesive thereon that is effective for rigidly attaching one or more components to the substrate and a second layer having an adhesive thereon for removably bonding to the vertical surface.

Referring to FIG. 4, another preferred embodiment of an article for mounting to a vertical surface 10 is shown comprising a substrate 102 having a first layer 106 and a second layer 108. The first layer 106 includes a front surface 110 having a first adhesive layer 118 thereon which suitable for permanently attaching one or more components 104 to the substrate 102. Preferably, the first adhesive layer 118 is formed from a conventional adhesive effective for forming a high-strength bond with wood, paper, and/or plastic which permanently attaches the one or more components 104 to the substrate 102. The second layer 108 includes an adhesive 124 such as a conventional low-tack (releasable) non-reactive reusable adhesive effective for removably attaching the substrate 102 to a vertical surface 10 formed from drywall or plaster or wood. In another preferred embodiment of the invention the first adhesive layer 118 is formed from an adhesive that includes an epoxy component and a hardener for providing an ultra-high strength bond for attaching one or more components to the substrate. In some embodiments of the invention, the epoxy component is an adhesive, plastic, paint or other material made from a class of synthetic thermosetting polymers containing epoxide groups. In some embodiments of the invention, the hardener reacts with the epoxy component to form a thermosetting polymer with high mechanical properties, temperature and chemical resistance.

Figure 5:
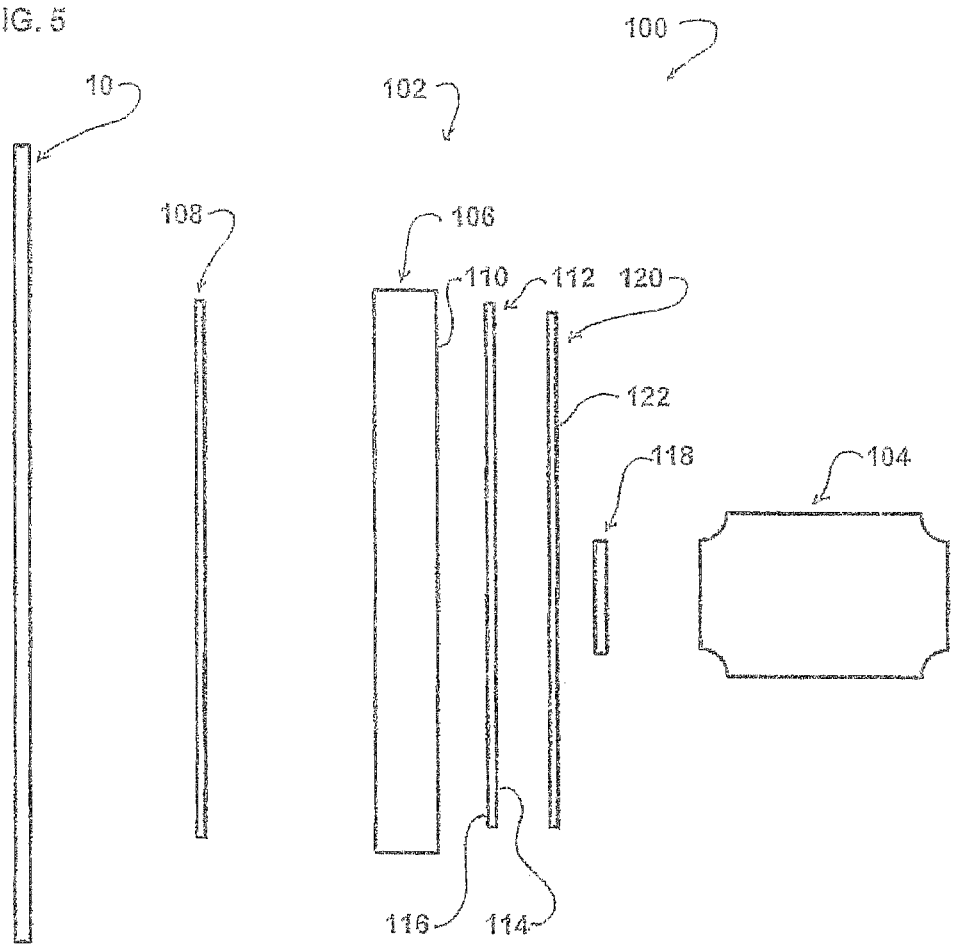
FIG. 5 is an exploded side schematic illustration of another preferred embodiment of an article for mounting to a vertical surface showing a substrate comprising a first layer having a film laminated thereon and a protective layer laminated to the film, and having a second layer having an adhesive for releasably bonding to the vertical surface.

In another preferred embodiment, as shown in FIG. 5, the substrate 102 comprises a first layer 106 having a front surface 110 with a plastic film 112 laminated thereto. Preferably the first layer 106 is formed from a polyethylene terephthalate (PET) material and the plastic film 112 is formed from polypropylene (PP). In one embodiment, the front surface 110 has printing thereon. In another preferred embodiment the plastic film 112 includes printing thereon. In another preferred embodiment, laminated to the front face 114 of the plastic film 112 is a protective layer 120 formed from a polyethylene terephthalate (PET) material. In some embodiments of the invention, the protective layer 120 is formed from a polymer film. Preferably, the protective layer 120 has a front face 122 and a conventional adhesive 118 thereon effective for forming a high-strength bond with the one or more components 104.

Figure 6:
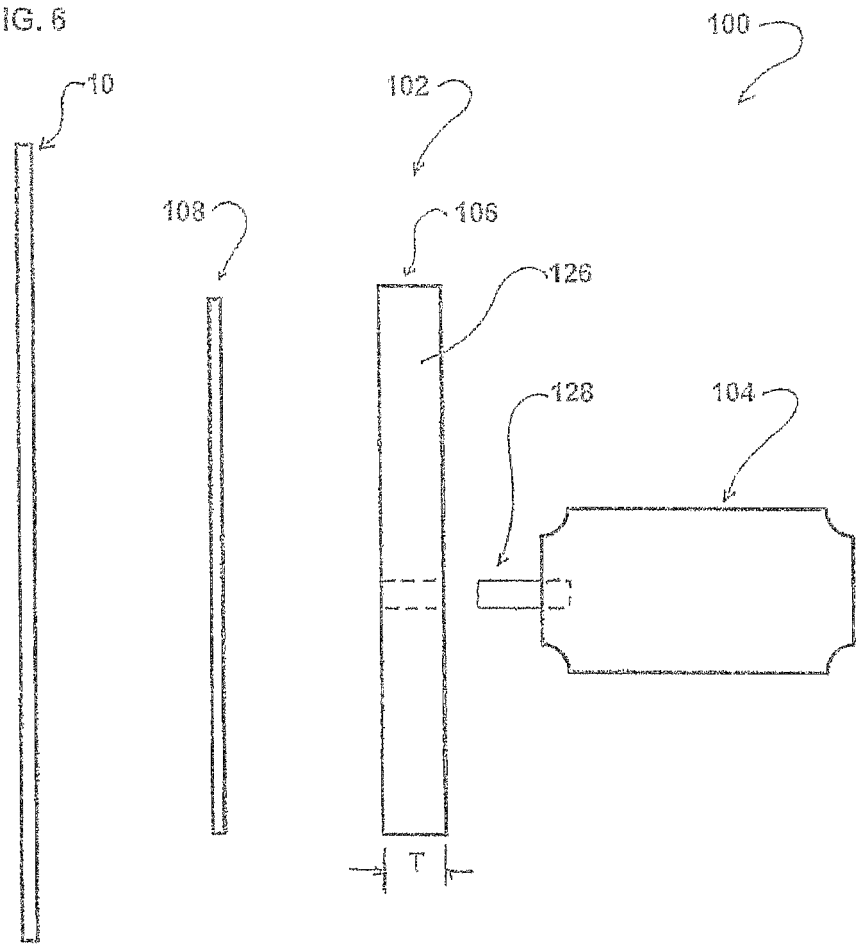
FIG. 6 is an exploded side schematic illustration of another preferred embodiment of an article for mounting to a vertical surface showing a material backing for receiving mechanical fasteners for attaching one or more components to the substrate.
Figure 7:
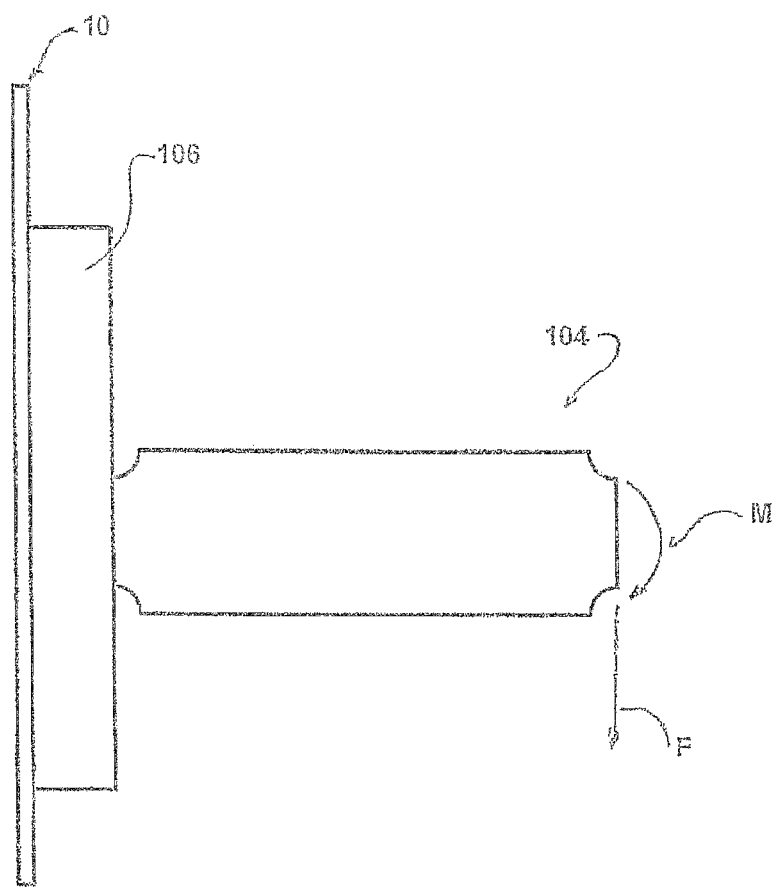
FIG. 7 is an exploded side schematic illustration of a preferred embodiment of an article for mounting to a vertical surface showing a force and moment created by the one or more components.

In another preferred embodiment of the invention, as illustrated in FIG. 6, the first layer 106 comprises foam or elastomeric material backing 126 having sufficient thickness T effective for mounting one or more components 104 thereon and which operates to absorb or offset a portion of the downward force F and moment M created by the one or more components 104 (FIG. 7). In another preferred embodiment the foam or elastic material backing 126 is of sufficient thickness and strength to receive and maintain one or more mechanical fasteners 128 for attaching one or more components 104 to the substrate 102. Examples of the one or more mechanical fasteners include, but not limited to, bolt, pin, nail, clutch and peg.

Figure 8:
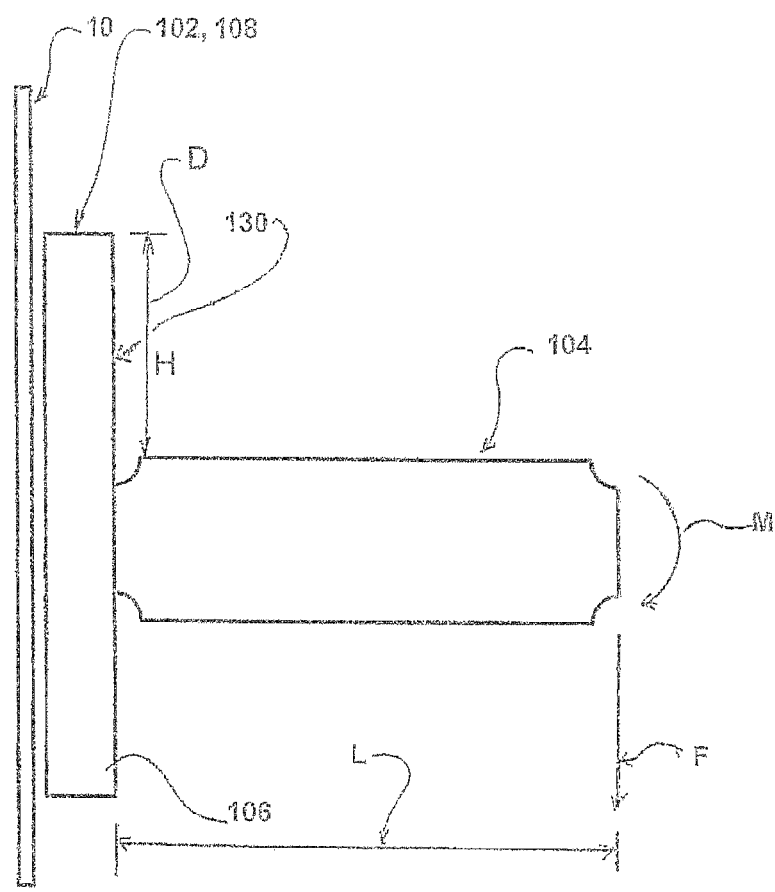
FIG. 8 is a side schematic illustration of the preferred embodiment of FIG. 7.
Figure 9:
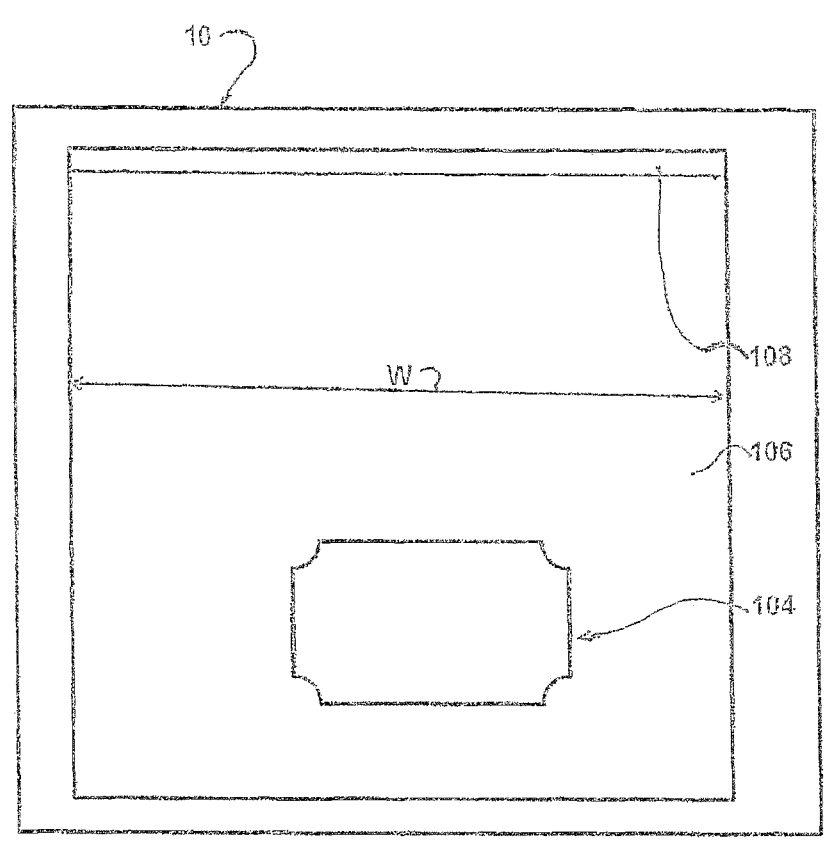
FIG. 9 is a front schematic illustration of a preferred embodiment of the invention.

In a preferred embodiment of the invention, as illustrated in FIGS. 7, 8 and 9, the substrate 102 and/or the second layer 108 is positioned for attaching to the vertical surface 10 such that a portion 130 (also known as the release area 130) of the substrate 102 or the second layer 108 is extended vertically above the one or more components 104 providing sufficient strength to resist the vertical force F and moment M (e.g., cantilever moment) produced by the one or more components 104 as well as a vertical force and moment created during use. The release area 130 has a vertical distance "H" above the one or more components 104, from the highest point of the one or more components 104 to the highest point of the substrate 102. The adhesive strength provided by the release area 130 of the substrate 102 is dependent on the length of the vertical distance. The vertical distance H should have sufficient length to counter the vertical force F and/or cantilever moment M. The vertical distance H is considered to have "sufficient" length if the vertical force F and cantilever moment M, either alone or in combination, are not able to destabilize the adhesive attachment between substrate 102 and the vertical surface 10. In some embodiments of the invention, the length of the vertical distance H is at least 2.5 cm. In other embodiments of the invention, the length of the vertical distance H is between 2.5 cm to 6.5 cm. It should now be apparent to one skilled in the art that the distance D above the one or more components 104 and the width W necessary to resist the vertical force F and moment M are dependent on the length L of each component 104, the mass and distribution of the each component, the adhesive used for the substrate 102 and the strength of the adhesive bond to the vertical surface, and the use of each component 104.

Figure 10:
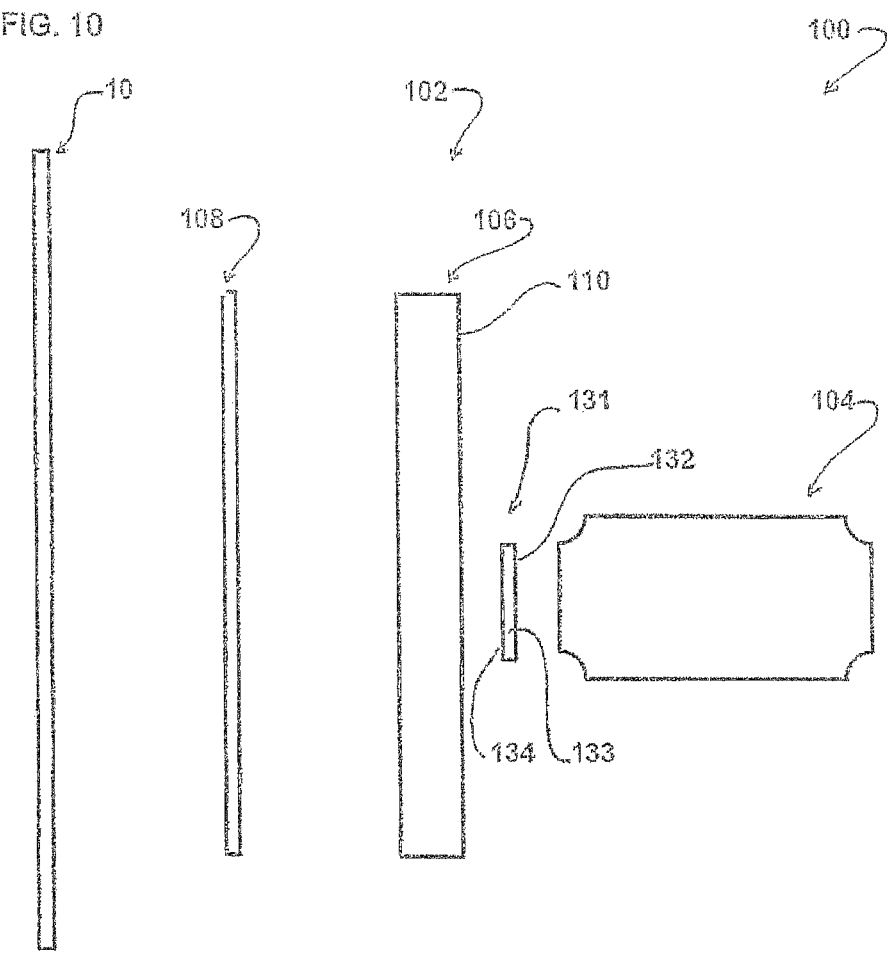
FIG. 10 is an exploded side schematic illustration of another preferred embodiment of the invention showing a two-sided tape for securing one or more components to the substrate.

In another preferred embodiment of the invention, as illustrated in FIG. 10, the substrate 102 comprises a two-sided tape 131 having a front face adhesive 132 effective for securely bonding to a component 104 and a back face adhesive 134 for securely bonding to the front surface 110 of the first layer 106. In a preferred embodiment of the invention, the two-sided tape 131 includes a foam structure 133 sandwiched between the front face adhesive 132 and the back face adhesive 134 that operates to absorb a portion of the downward force F and moment M created by one or more components 104 (FIG. 7) and that created during use of the article by a user.

In a preferred embodiment of the invention the substrate 102 includes a second layer 108 having a non-chemical adhesion surface, rather than a chemical adhesive surface, as described above. In use, the non-chemical adhesion surface operates to releasably adhere to a vertical surface having a smooth surface by way of micro features and/or by way of static electricity.

Figure 11:
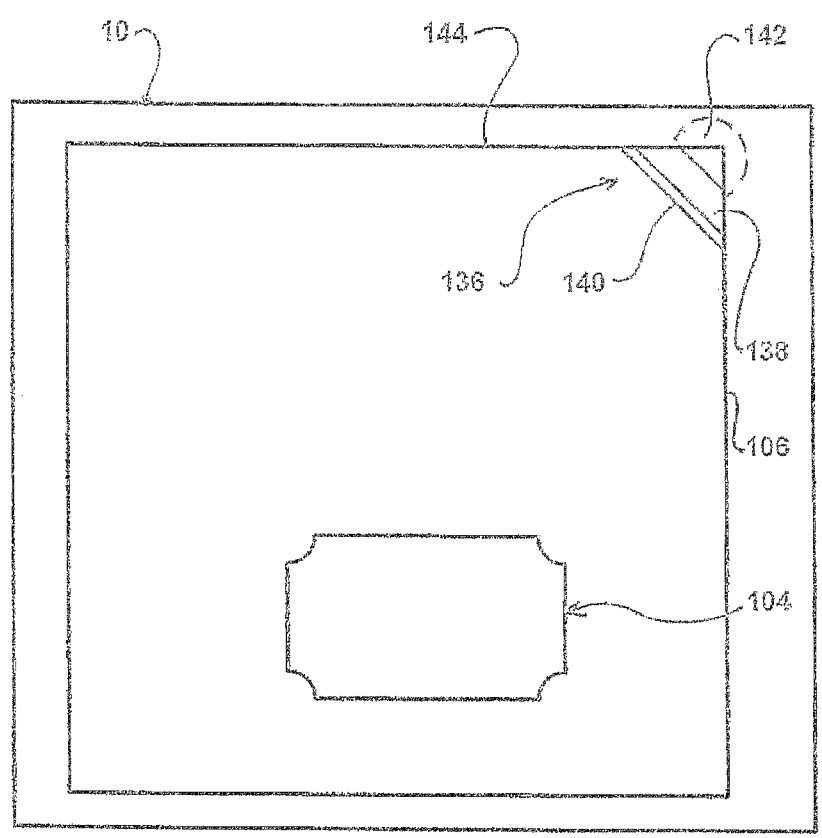
FIG. 11 is a front schematic illustration of a preferred embodiment of the invention showing a release tag for aiding in the removal of the substrate from the vertical surface.

In a preferred embodiment of the invention, as illustrated in FIG. 11, the article for mounting to a vertical surface 10 further comprises a release tab 136 positioned along the substrate 102, effective for allowing the substrate to flex or bend to improve its ability to separate from the vertical surface while minimizing the likelihood of damage to the vertical surface. In one embodiment, the release tab 136 has a shape that is apparent to users as a peel tab and if formed from the same composition as substrate 102. In a preferred embodiment the release tab 136 is in the form of a plastic film having a first portion 138 secured to the front surface 110 of the substrate 102 (or in a preferred embodiment the first layer 106 of the substrate 102) and a second portion 140 that operates to provide a grip for use by an individual in peeling the substrate 102 from the vertical surface 10. In another preferred embodiment of the invention, a backing sheet is placed on the release tab 136 forming a release area such that a portion 142 of the upper edge 144 of the substrate 102 does not have any adhesive applied thereto. In the present invention, the term "backing sheet" refers to one or more layers of material(s) that is arranged to mask the adhesive so that the adhesive cannot function to, for example, bind a substrate 102 to a vertical surface 10. In some embodiments of the invention, the backing sheet is made of non-adhesive plastic film or paper sheet. In some embodiments of the invention, the backing sheet is coated with a low-tack adhesive to temporarily attach the backing sheet (and accordingly the release tab 136) to the vertical surface 10, but the low-tack adhesive coated on the backing sheet, in comparison to that used on other portions of the substrate 102, has a relatively lower bond strength.

In this way an individual can grip the release tab 136 to pull the substrate from the vertical surface 10. Preferably, the release tab 136 is placed along a portion of the upper edge and/or the side edge in order to permit the substrate to be easily removed from the vertical surface while minimizing the likelihood of damaging the vertical surface. It should now be understood that the placement of the release tab 136 will also determine the direction of the peel and the last point where the substrate will be removed from the vertical surface.

Figure 12:
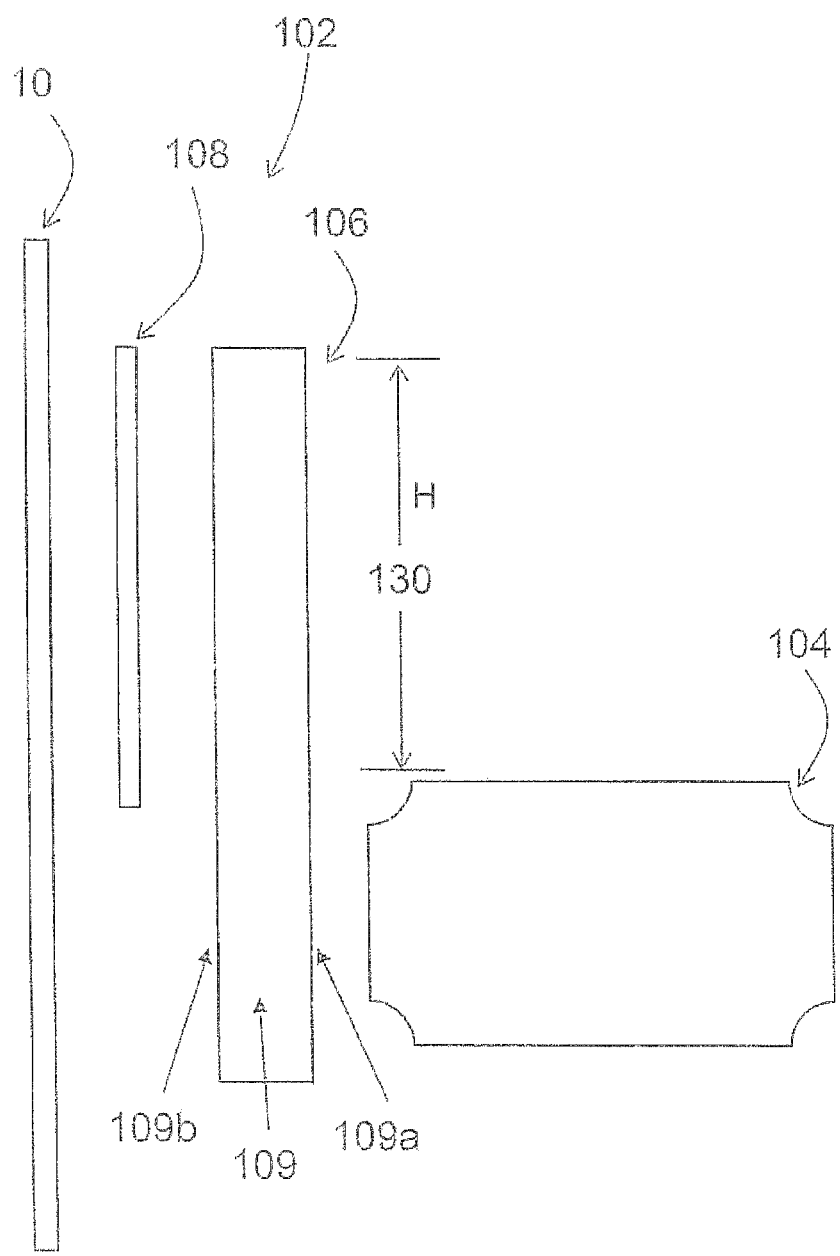
FIG. 12 is an exploded side schematic illustration of another preferred embodiment of the invention showing that an adhesive layer does not cover a back surface of a contact area of a substrate.
Figure 13:
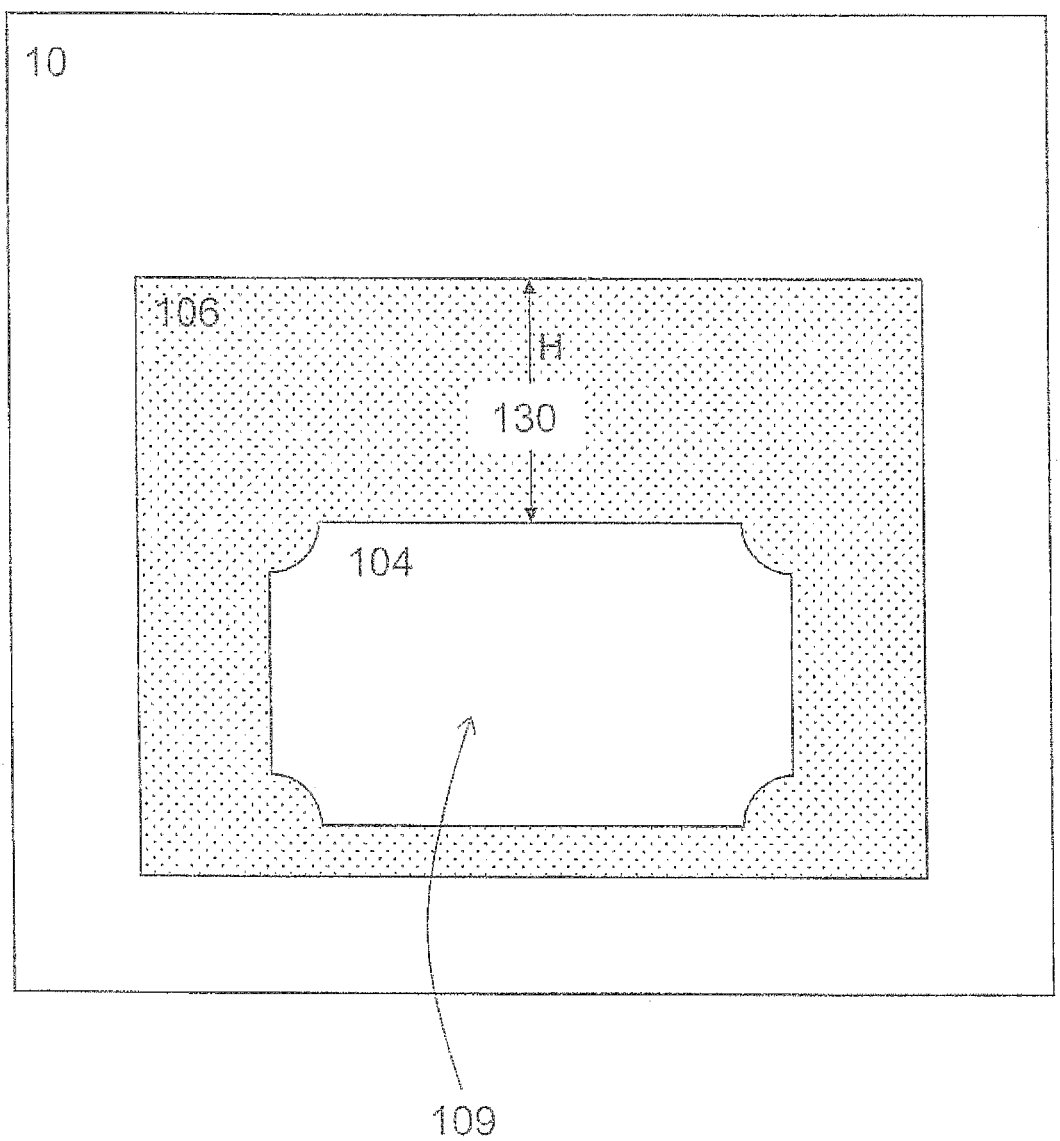
FIG. 13 is a front schematic illustration of a preferred embodiment of FIG. 12.

In a preferred embodiment of the invention, as illustrated in FIG. 12 and FIG. 13, the adhesive film 108 covers only a portion of the back side of the first layer 106 of the substrate 102, avoiding, partially or entirely, a contact area 109 of the first layer 106 to minimize the likelihood of damage to the vertical surface 10 when removing or detaching the substrate 102 from the vertical surface 10. The contact area 109 refers to one or more portion(s) of the substrate 102 that make direct contact with one or more rigid or semi-rigid components 104. The contact area 109 comprises a front surface 109a and a back surface 109b, wherein one or more rigid or semi-rigid components 104 are permanently attached to the front surface 109a of the contact area 109. In another preferred embodiment of the invention, as illustrated in FIG. 12 and FIG. 13, the adhesive film 108 (the second layer of the substrate 102) does not cover the back surface 109b of the contact area 109. Thus, when attaching the substrate 102 to the vertical surface 10, the contact area 109 of the substrate 102 is not bonded to the vertical surface 10.

The inventors have discovered that, when bending or flexing the substrate 102 to remove the substrate 102 from the vertical surface 10, the one or more of the rigid or semi-rigid components 104 may limit the bending of the substrate —in another words, the portion of the substrate 102 in the vicinity of a component 104 (i.e., in close proximity to the contact area 109) is more resistant to the bending than the portion(s) of the substrate 102 located farther away from the one or more rigid or semi-rigid components 104. During the process of removing or detaching the substrate 102 from the vertical surface 10 by bending of the substrate 102, it is more difficult and requires more strength to remove or detach the portion of the substrate 102 located in the vicinity of the rigid or semi-rigid components 104 (i.e., in close proximity to the contact area 109) from the vertical surface 10 due to the rigid or semi-rigid components 104. Thus, once the strength applied exceeds the required threshold to detach the substrate 102, the speed of releasing the second layer 108 (that bonds the substrate 102 to the vertical surface 10) from the vertical surface 10 may increase suddenly. The sudden increase in the speed of releasing the second layer 108 from the vertical surface 10 may increase the likelihood of damage to the vertical surface 10, for example, peeling off wall paints or wallpapers. Accordingly, it is technically advantageous to leave the contact area 109 of the first layer 106 not covered by the adhesive second layer 108 which comprises a low-tack non-reactive reusable adhesive. In some embodiments of the invention, the substrate 102 further comprises a release area 130, located above the highest point of the one or more rigid or semi-rigid component(s) 104, has a height of at least 2.5 cm.

Figure 14:
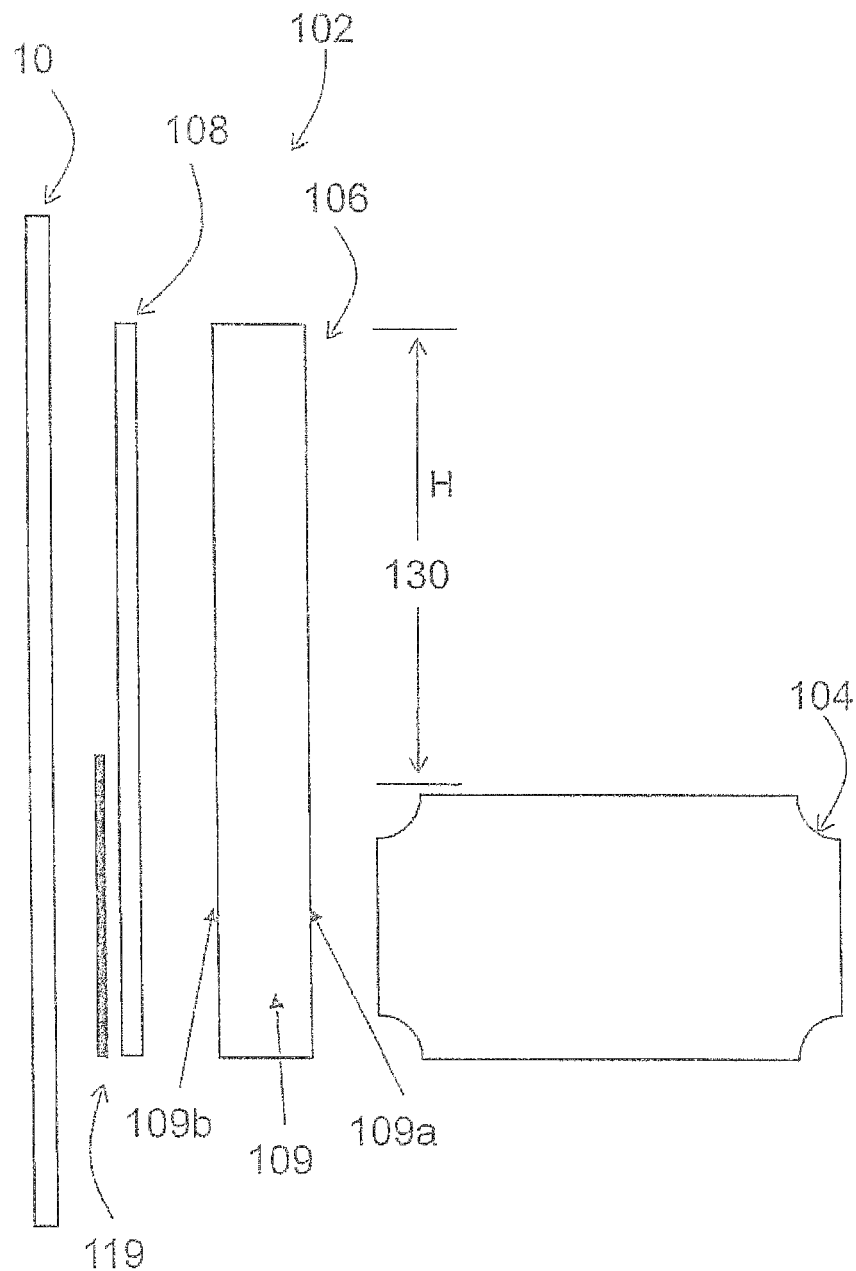
FIG. 14 is an exploded side schematic illustration of another preferred embodiment of the invention showing that a portion of an adhesive layer covering a contact area of a substrate is masked with a backing sheet.

In another preferred embodiment of the invention, as illustrated in FIG. 14, a substrate 102 comprises a contact area 109, wherein the contact area 109 comprises a front surface 109a and a back surface 109b. One or more rigid or semi-rigid components 104 are permanently attached to the front surface 109a of the contact area 109. Although the back surface of a first layer 106 is fully covered by a second layer 108 that has low-tack non-reactive reusable adhesive, a backing sheet 119 is placed on a back surface of a portion of the second layer 108, wherein the portion of the second layer 108 substantially overlaps with the contact area 109 of the first layer 106. As the backing sheet 119 covers the adhesive on the second layer 108, the contact area 109 cannot be bond to the vertical surface 10. During the process of bending or flexing the substrate 102 to detach the substrate 102 from the vertical surface 10, this "selective masking" of the adhesive second layer 108 may minimize damage to the vertical surface 10, for example, in areas around the contact area 109, where the rigid or semi-rigid components 104, if adhesively attached to the vertical surface 10, make it not possible for the substrate 102 to be bent or detached off the vertical surface 10 at a low speed. The present invention therefore could alleviate the problem of damaging the vertical surface 10 during the process of removing the substrate 102 from the vertical surface 10. In some further embodiments of the invention, a release area 130 of the substrate, located above the highest point of the one or more rigid or semi-rigid component(s) 104, has a height of at least 2.5 cm.

In yet another embodiment of the invention, a substrate 102 comprises a contact area 109, wherein the contact area 109 comprises a front surface 109a and a back surface 109b. One or more rigid or semi-rigid components 104 are permanently attached to the front surface 109a of the contact area 109. Although an adhesive second layer 108 fully covers the back surface of a first layer 106, the contact area 109 comprises a plurality of perforations. Although the contact area 109 of the first layer 106 is attached to the vertical surface 10 via the adhesive second layer 108, the plurality of perforations in the contact area 109 reduces the attachment interface between the contact area 109 and the vertical surface 10, which accordingly weakens the bond strength of the attachment between the contact area 109 and the vertical surface 10. Thus, when bending or flexing the substrate 102 in vicinity of the one or more rigid or semi-rigid components 14, despite the sudden increase in the speed of releasing or detaching the substrate 102 from the vertical surface 10, the weaker bond strength between the contact area 109 and the vertical surface 10 reduces the likelihood of damaging the vertical surface 10.

Figure 15:
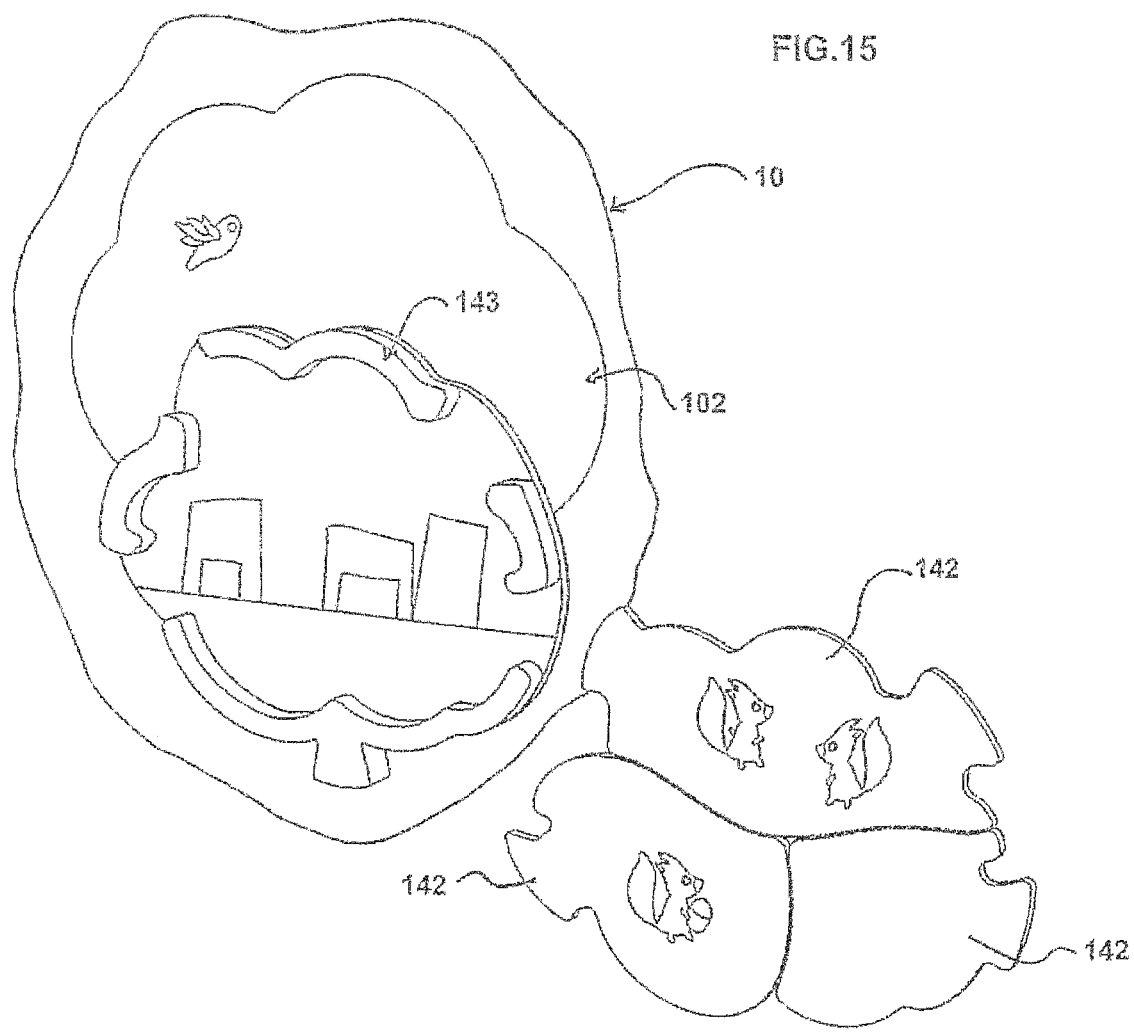
FIG. 15 is an illustration of an article for mounting to a vertical surface having at least one component attached to a substrate and together operate as a story board with one or more detachable elements.
Figure 16:
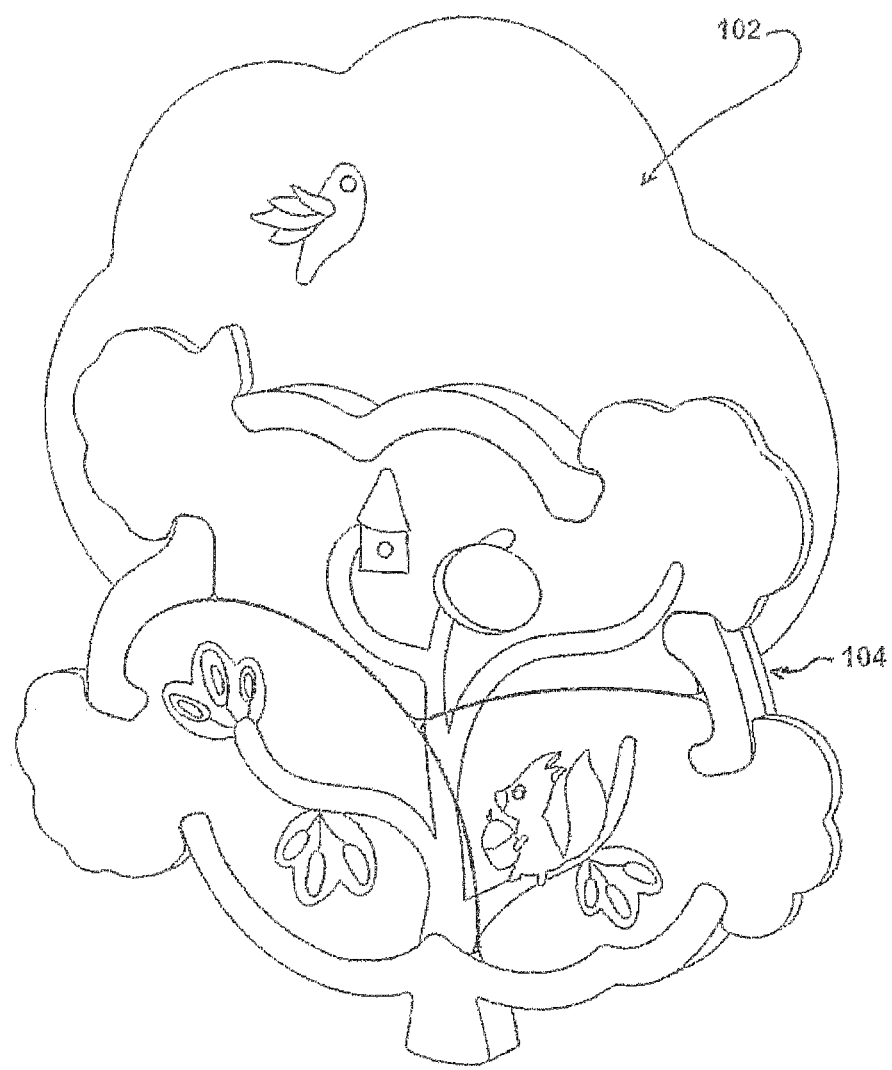
FIG. 16 is an illustration of another embodiment of the article of FIG. 12 showing one or more detachable elements that operate together to create a puzzle.

In a preferred embodiment of the invention, as illustrated in FIG. 15 and FIG. 16, the at least one component 104 attached to a substrate 102 which together operate as a story board comprising one or more detachable elements 142 that are preferably removably supported within a frame 143. In a preferred embodiment of the invention the one or more detachable elements 142 are in the form of a plastic or wood sheets or plastic films that removable adhere to the surface of the substrate such as by static electricity or by a reusable, low tack adhesive, within the frame 143 such as by a frictional fit. In a preferred embodiment the one or more detachable elements cooperate to create a story board (FIG. 15) or cooperate together to create a puzzle, such as a jigsaw puzzle (FIG. 16).

Figure 17:
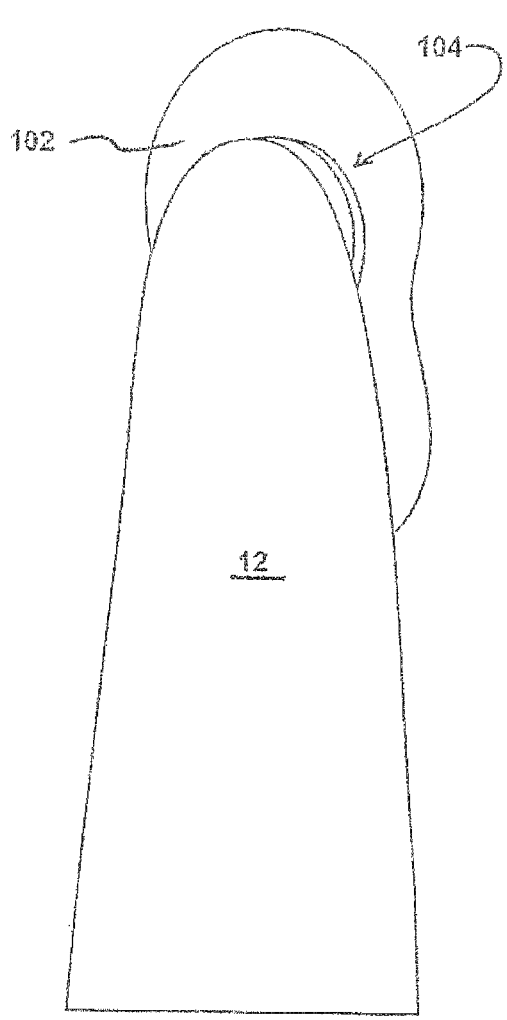
FIG. 17 is an illustration of an article for mounting to a vertical surface showing comprising a substrate and a component having a pivoting movable element that operates a clip.
Figure 18:
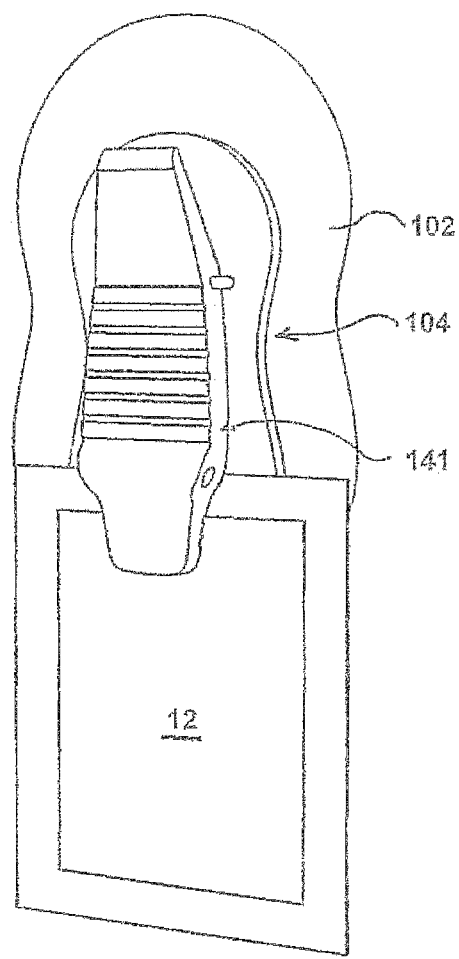
FIG. 18 is an illustration of an article for mounting to a vertical surface having a substrate and at least one component in the form of a knob that operates to support objects thereon.

In another preferred embodiment of the invention, as illustrated in FIG. 17 the article for mounting to a vertical surface comprises a substrate 102 securely attached to at least one component 104 having a pivoting movable element 141 that operates a clip. In another preferred embodiment of the invention, as illustrated in FIG. 18, the at least one component 104 is in the form of a knob that operates to support objects 12, such as clothing thereon.

Figure 19:
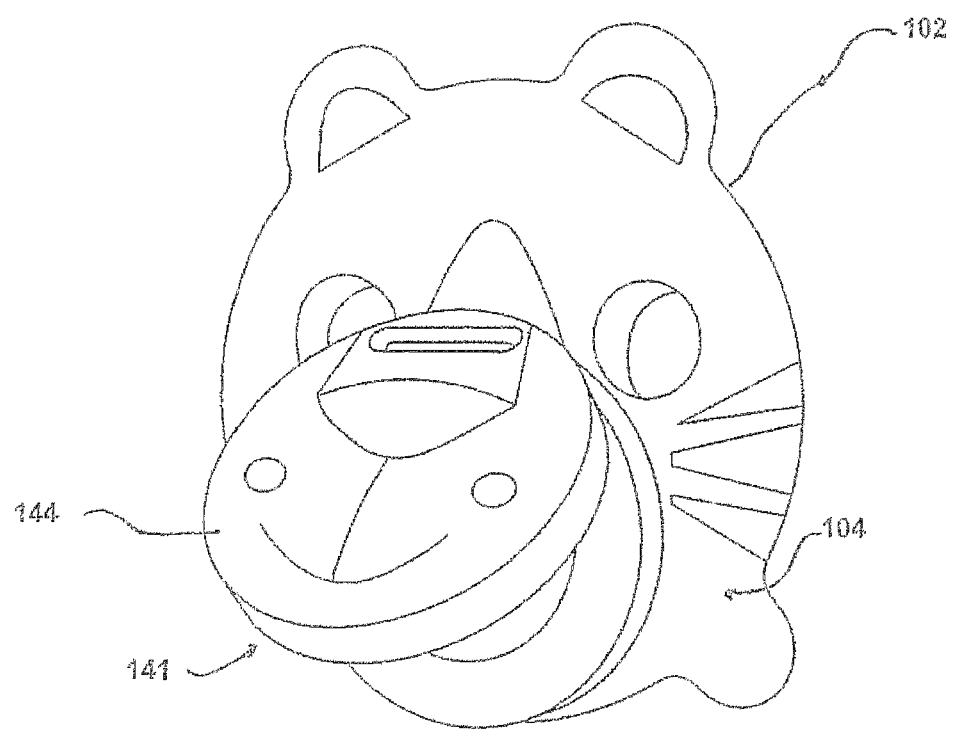
FIG. 19 is an illustration of an article for mounting to a vertical surface showing one or more components that operate as a toy having a play feature that operates to create a sound.
Figure 20:
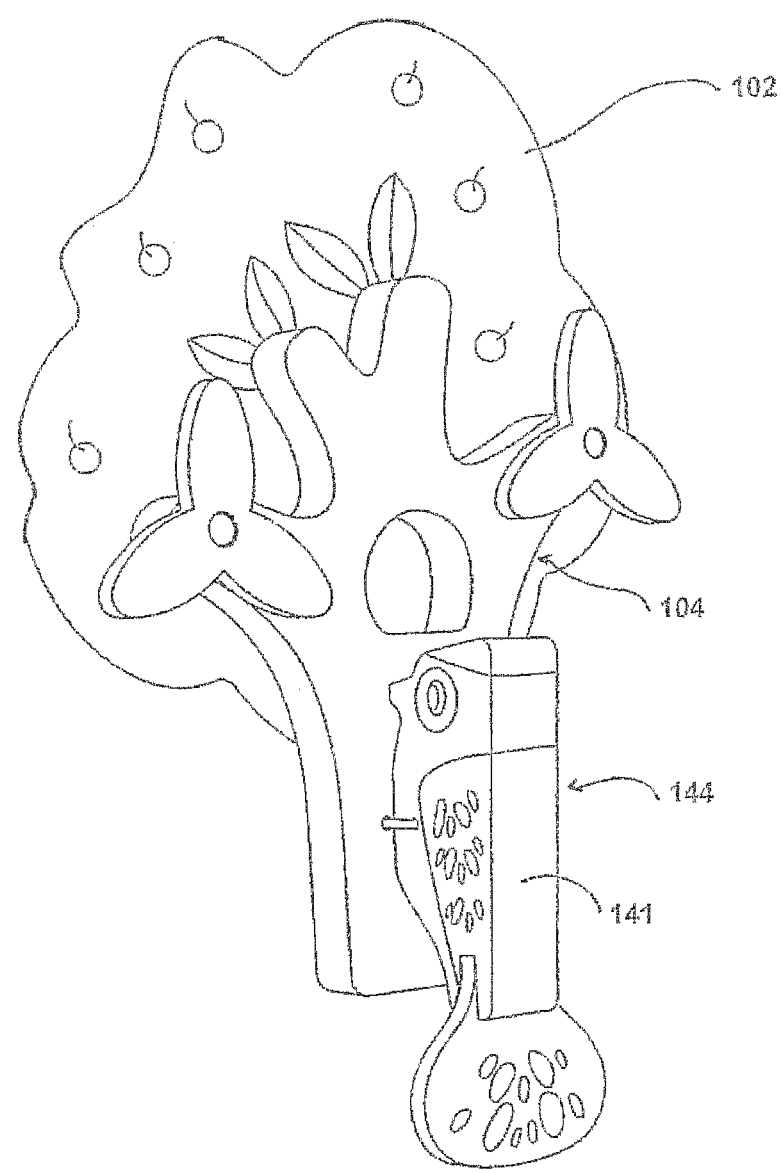
FIG. 20 is an illustration of an another article for mounting to a vertical surface having a substrate and one or more components having a play feature that operated to creates a sound.

In another preferred embodiment of the invention, as illustrated in FIG. 19, the article for mounting to a vertical surface comprises a substrate 102 having at least one component 104 is shown in the form of a toy having a play feature 144 having a movable element 141 that operates to perform the function of creating a sound and is incorporated as part of an article, such as the face of an animal. In another illustrative example, as illustrated in FIG. 20, the play feature 144 has a movable element 141 that operates to perform the function of creating a sound and is a separate element that cooperates with other movable and/or stationary elements to create a scene.

Figure 21:
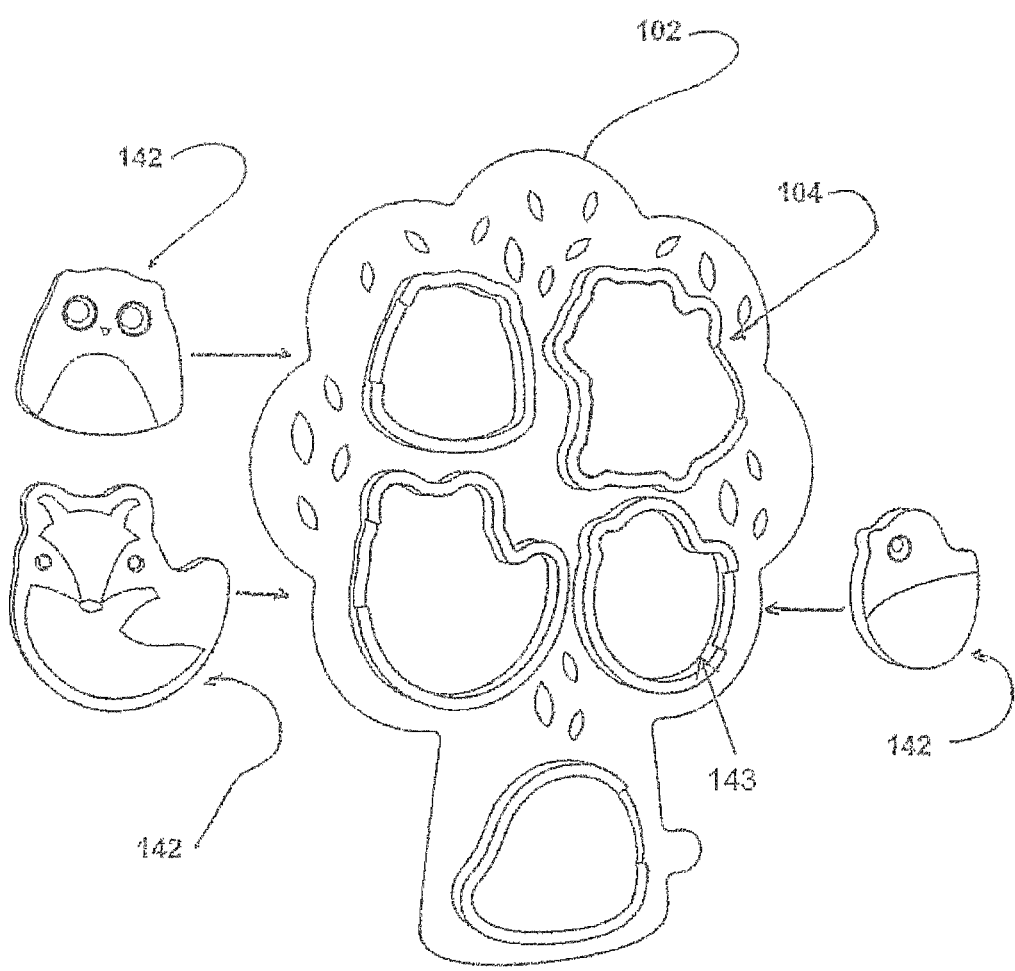
FIG. 21 is an illustration of an article for mounting to a vertical surface having a substrate and one or more components for supporting one or more detachable elements that operate together to perform the function of a shape sorter.

In another preferred embodiment of the invention, as illustrated in FIG. 21, the article for mounting to a vertical surface is in the form of a toy and comprises a substrate 102 and at least one component 104 for supporting one or more detachable elements 142 that operate together to perform the function of a shape sorter. In a preferred embodiment the one or more detachable elements 142 are removably supported within a frame 143. In a preferred embodiment of the invention the one or more detachable elements 142 are in the form of a plastic or wood sheets or plastic films that removable supported within the frame 143 such as by static electricity or by a reusable, low tack adhesive, or by a frictional fit.

Figure 22:
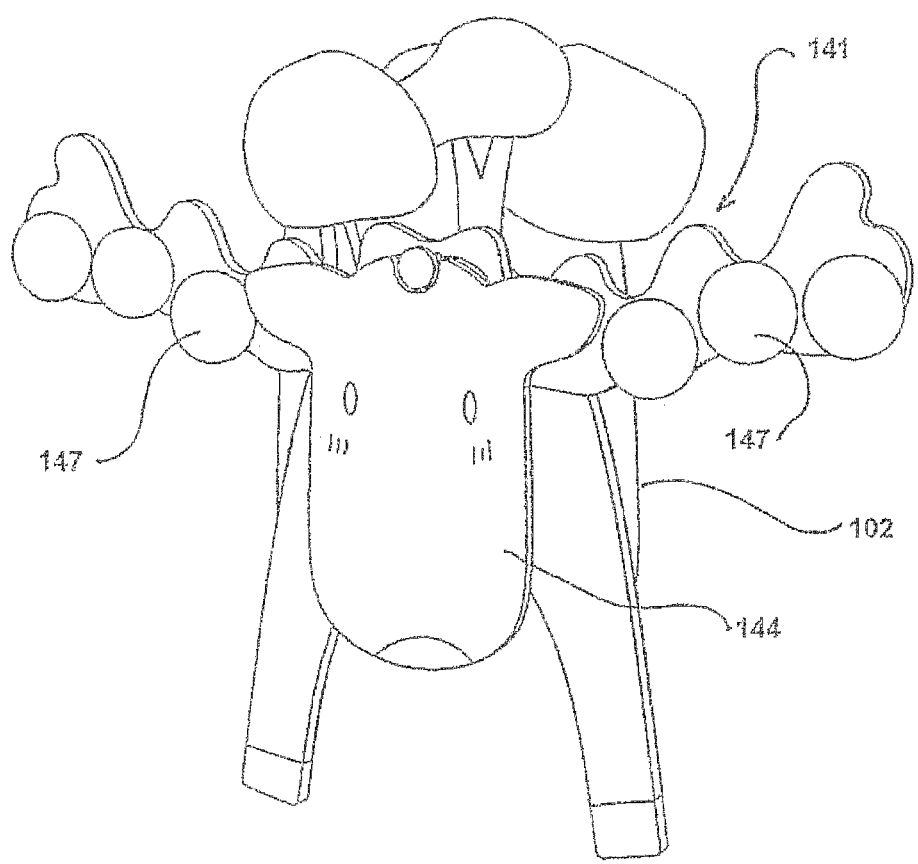
FIG. 22 is an illustration of an article for mounting to a vertical surface having a substrate and one or more components having a play feature with a pivoting movable element with attachment elements for attaching objects whereby in operation, the pivoting movable element conventionally pivots depending on the placement and weight of one or more objects placed on the attachment elements.

In another preferred embodiment of the invention, as illustrated in FIG. 22, the article for mounting to a vertical surface is in the form of a balancer comprising a substrate 102 and at least one component 104 having a play feature 144 with a pivoting movable element 141 having attachment elements 147 for attaching objects. In operation, the pivoting movable element 141 conventionally pivots depending on the placement and weight of one or more objects placed on the attachment elements 147.

Figure 23:
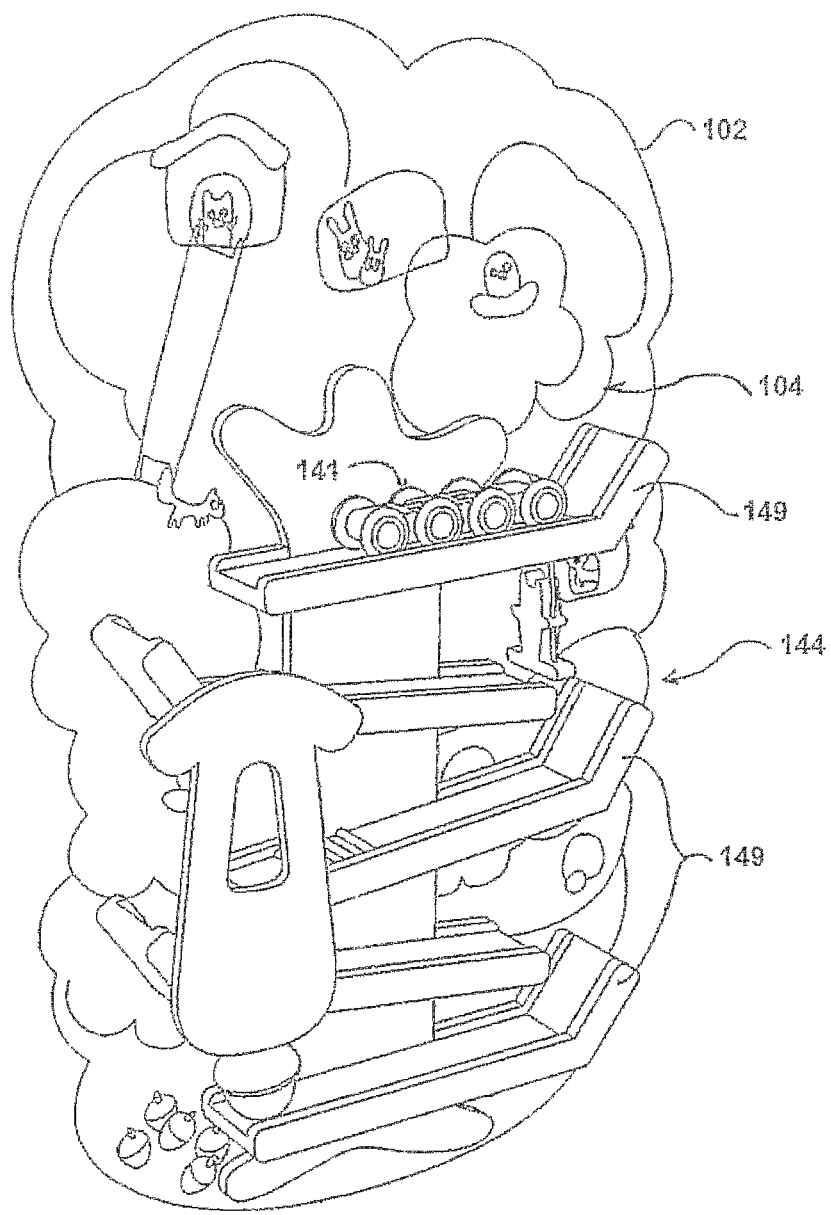
FIG. 23 is an illustration of an article for mounting to a vertical surface in the form of a toy comprising a substrate and one or more components having a play feature in the form of a track and having at least one or more movable elements that operate to travel along the play feature.

In another preferred embodiment of the invention, as illustrated in FIG. 23, the article for mounting to a vertical surface is in the form of a toy comprising a substrate 102 and one or more components 104 having a play feature 144 in the form of a track and having at least one or more movable elements 141 that operate to travel along the play feature 144. In a preferred embodiment the play feature 144 is formed in sections 149 that pivot in response to movement of the one or more movable elements 141 allowing the one or more movable elements 141 to travel along the sections 149.

Figure 24:
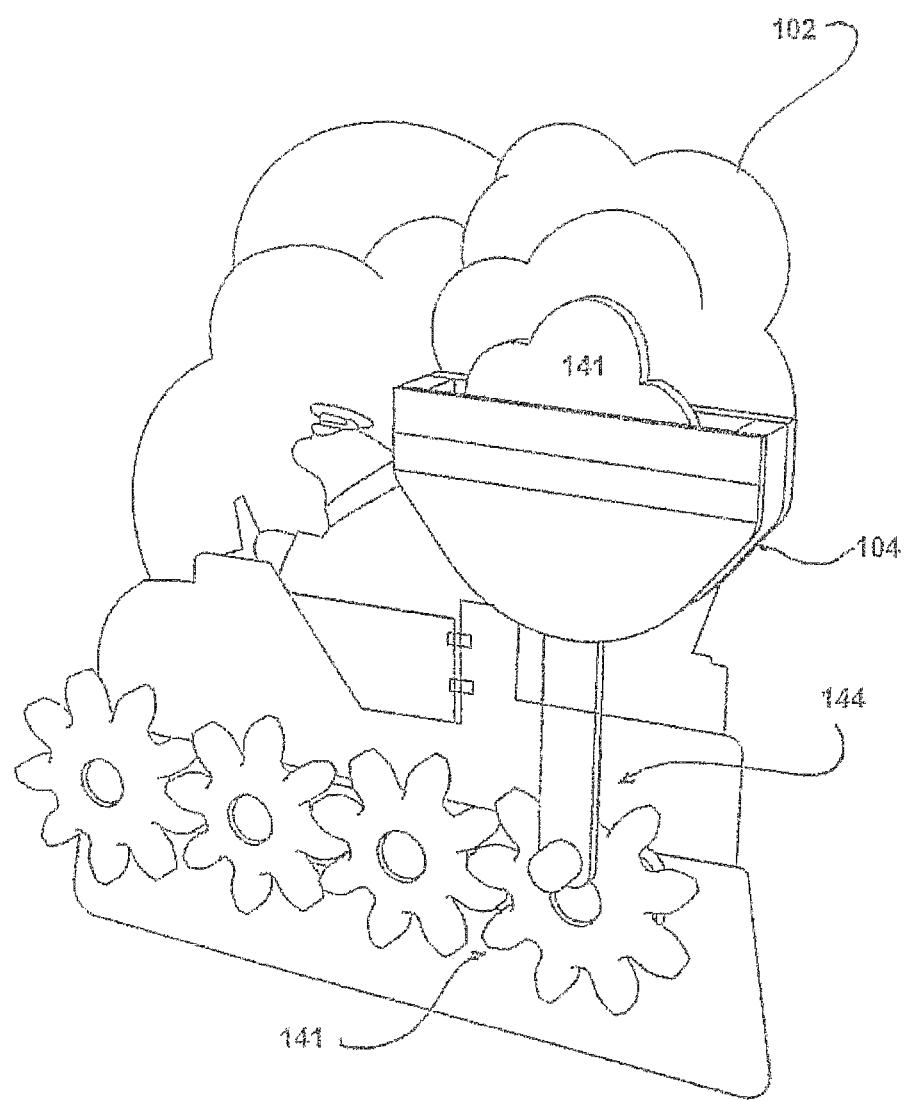
FIG. 24 is an illustration of an article for mounting to a vertical surface in the form of a toy comprising a substrate and at least one component having one or more play features that include one or more movable elements in the form a rotating interconnected disks or gears and reciprocating disk(s) that cooperate and create motion to the play feature.

In another preferred embodiment of the invention, as illustrated in FIG. 24, the article for mounting to a vertical surface is in the form of a toy comprising a substrate 102 and at least one component 104 having a play feature 144. In a preferred embodiment the play feature includes one or more movable elements 141 in the form a rotating interconnected disks or gears and reciprocating disk(s) that cooperate and create motion to the play feature 144.

Figure 25:
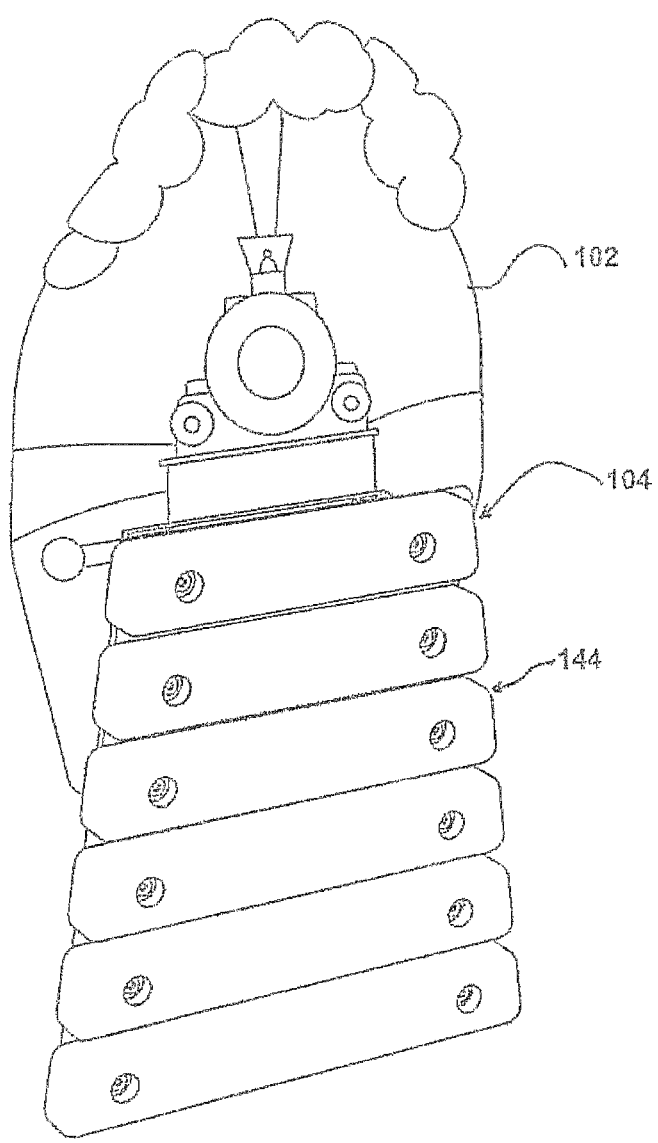
FIG. 25 is an illustration of an article for mounting to a vertical surface in the form of a toy, such as a musical instrument, comprising a substrate and at least one component having a play feature for creating musical tones.

In another preferred embodiment of the invention, as illustrated in FIG. 25, the article for mounting to a vertical surface is in the form of a toy such as a musical instrument comprising a substrate 102 and at least one component 104 having a play feature 144 for creating musical tones. In a preferred embodiment, as illustrated, the play feature is in the form of metal or wood blocks of different sizes for producing different musical notes when struck, such as by a mallet.

It should now be apparent to one skilled in the art that the subject invention provides an article having a substrate that can be removably attached to a vertical surface, that has sufficient strength to maintain the article on the vertical surface during use, that can be easily removed from the vertical surface without damaging or minimizing the likelihood of damage to the surface, and permits the article to be easily transported and mounted to a vertical surface at another location. It should also now be apparent to one skilled in the art that the subject invention provides an article that can be easily mounted to a vertical surface and can be easily removed from the vertical surface without damaging or minimizing the likelihood of damaging the vertical surface and includes one or more components that protrude generally perpendicularly direction from the vertical surface.

It should also now be apparent to one skilled in the art that the article for mounting to a vertical surface is an integral structure that operates such that the substrate is effective for releasably mounting to the vertical surface and for securely supporting one or more components. The substrate further operates to sufficiently support and maintain the article on the vertical surface while allowing for easy removal from the vertical surface. It should be understood that the substrate (and any various layers comprising the substrate) can be formed in one or more colors, shapes, and designs, and dimensions. It should also be understood that in a preferred embodiment the one or more layers forming the substrate can include various printed material thereon.

The above is a description of embodiments of the present invention. It is envisioned that those skilled in the art can design alternative embodiments of this invention that falls within the scope of the invention. In particular, it is to be appreciated that features from various embodiment(s) may be combined to form one or more additional embodiments.

The invention claimed is:

1. An article for mounting to a vertical surface comprising:
   a bendable or flexible substrate, comprising a release area;
   at least one play feature permanently and directly attached to said substrate, wherein said at least one play feature is made of rigid or semi-rigid material and comprises a plurality of pieces; and
   said substrate having an adhesive covering at least a portion of said substrate, wherein the adhesive operates to removably attach said substrate to the vertical surface;
   wherein said release area is arranged to have a vertical distance above said at least one play feature, wherein said at least one play feature produces a cantilever moment and wherein said vertical distance of said release area is operable to counter said cantilever moment.

2. The article of claim 1, wherein said vertical distance is at least 2.5 cm.

3. The article of claim 1, wherein said vertical distance is between 2.5 cm and 6.5 cm.

4. The article of claim 1 further comprising a release tab that operates to provide a grip for use in peeling said substrate from the vertical surface.

5. The article of claim 4 wherein said release tab is in close proximity to said at least one play feature.

6. The article of claim 1 wherein said substrate comprises a single layer or a plurality of layers.

7. The article of claim 1 wherein said substrate has a thickness of about 0.15 mm to about 0.425 mm.

8. The article of claim 1 wherein said substrate has a back side and a printable front side, wherein said adhesive is a pressure sensitive adhesive applied to said back side.

9. The article of claim 8 wherein said front side of said substrate includes a relatively thin polymer film laminated thereon.

10. The article of claim 1 wherein said substrate comprises a high bond strength two sided tape adapted for forming a strong non-releasable bond with said at least one play feature.

11. The article of claim 1 wherein said at least one play feature is permanent and directly attached to a contact area of said substrate, said contact area comprises a front surface arranged to receive said at least one play feature, and a back surface arranged to face said vertical surface.

12. The article of claim 11 wherein said contact area comprises a portion operable to reduce bond strength when the article is mounted to the vertical surface.

13. The article of claim 11 wherein said back surface is not covered by said adhesive covering.

14. The article of claim 11 wherein said back surface is masked by a backing sheet.

15. The article of claim 14 wherein said backing sheet is made of non-adhesive plastic film or paper sheet.

16. The article of claim 11 wherein said back surface has a plurality of perforations.

17. The article of claim 1 wherein said at least one play feature is part of a play system having one or more movable elements.

18. The article of claim 1 wherein said at least one play feature is an entertainment device selected from a list consisting of a toy, a door knocker, a puzzle, a writing surface, a paper clip, a shape sorter, a balancer, and a play track.

19. An article for mounting to a vertical surface comprising:
- a bendable or flexible substrate having a first layer and a second layer, wherein said second layer comprises a release area;
- at least one play feature permanently and directly attached to said first layer, wherein said at least one play feature is made of rigid or semi-rigid material and comprises a plurality of pieces;
- a low-tack non-reactive reusable adhesive layer covering at least a portion of said second layer that operates to attach said substrate to the vertical surface;
- wherein said release area is arranged to have a vertical distance above said at least one play feature, wherein said at least one play feature produces a cantilever moment and wherein said vertical distance of said release area is sufficient to counter said cantilever moment.

20. The article of claim 19 wherein said first layer comprises a contact area, wherein said contact area comprises a front surface arranged to receive said at least one play feature, and a back surface arranged to face said vertical surface.

21. The article of claim 20 wherein said contact area comprises a portion operable to reduce bond strength when the article is mounted to the vertical surface.

22. The article of claim 20 wherein said back surface is not covered by said adhesive covering.

23. The article of claim 20 wherein said back surface is masked by a backing sheet.

24. The article of claim 23 wherein said backing sheet is made of non-adhesive plastic film or paper sheet.

25. The article of claim 20 wherein said back surface has a plurality of perforations.

26. The article of claim 19 wherein said vertical distance is at least 2.5 cm.

27. The article of claim 19, wherein said vertical distance is between 2.5 cm and 6.5 cm.

28. The article of claim 19 wherein said release area operates as a grip for peeling said substrate from the vertical surface.

29. The article of claim 19 wherein said first layer has a front surface with printing thereon and a plastic film layer laminated thereto.

30. The article of claim 19 wherein said second layer has a front surface with printing thereon and a plastic film layer laminated thereto.

31. The article of claim 29 wherein said first layer is formed from a PET film and said plastic film layer is formed from polypropylene (PP).

32. The article of claim 19 wherein said first layer includes reverse printing on its back surface.

33. The article of claim 19 wherein said first layer includes a front surface having printing thereon.

34. The article of claim 29 wherein said plastic film layer includes printing thereon.

35. The article of claim 29 wherein said substrate further comprises a protective layer positioned over said plastic film layer, wherein said protective layer is formed from a polymer film.

36. The article of claim 19 wherein said substrate is perforated at certain areas or shaped to reduce the amount of contact that said substrate has with the vertical surface thereby reducing the likelihood of damaging the vertical surface.

37. The article of claim 19 wherein said at least one play feature is an entertainment device selected from a list consisting of a toy, a door knocker, a puzzle, a writing surface, a paper clip, a shape sorter, a balancer, and a play track.

38. The article of claim 19 wherein said at least one play feature is part of a play system having one or more movable elements.

* * * * *